US006236938B1

United States Patent
Atkinson et al.

(10) Patent No.: US 6,236,938 B1
(45) Date of Patent: May 22, 2001

(54) SYSTEMS AND METHODS FOR CREATING MAPS USING GPS SYSTEMS

(75) Inventors: David Atkinson, Parker, CO (US); Steve Loper, Woodridge, IL (US); Leonard Dattilo, Madison, IN (US); Matthew Drew, Denver, CO (US)

(73) Assignee: Amadeus Consulting Group, Inc., Boulder, CO (US)

( * ) Notice: Subject to any disclaimer, the term of this patent is extended or adjusted under 35 U.S.C. 154(b) by 0 days.

(21) Appl. No.: 09/368,798

(22) Filed: Aug. 5, 1999

(51) Int. Cl.$^7$ ..................................................... G06F 17/60
(52) U.S. Cl. ...................... 701/214; 701/213; 342/357.02
(58) Field of Search .................................. 701/207, 208, 701/213, 214, 217; 342/357.06, 357.08, 357.12, 357.14, 357.02; 702/94, 95, 197

(56) References Cited

U.S. PATENT DOCUMENTS

| | | | | |
|---|---|---|---|---|
| 4,741,245 | * | 5/1988 | Malone | 89/41.03 |
| 5,077,557 | * | 12/1991 | Ingensand | 342/357.02 |
| 5,144,693 | | 9/1992 | Morgan | 395/158 |
| 5,361,200 | | 11/1994 | Weybright et al. | 364/401 |
| 5,526,291 | * | 6/1996 | Lennen | 701/214 |
| 5,568,152 | * | 10/1996 | Janky et al. | 342/357.02 |
| 5,655,136 | | 8/1997 | Morgan | 382/182 |
| 5,739,785 | * | 4/1998 | Allison et al. | 342/357.02 |
| 5,857,201 | | 1/1999 | Wright, Jr. et al. | 707/104 |
| 5,904,726 | | 5/1999 | Vock et al. | 701/208 |
| 5,969,669 | * | 10/1999 | Fshikawa et al. | 342/357.02 |
| 6,064,942 | * | 5/2000 | Johnson et al. | 701/213 |
| 6,092,033 | * | 7/2000 | Uhlmann | 701/214 |
| 6,104,978 | * | 8/2000 | Harrison et al. | 701/214 |

FOREIGN PATENT DOCUMENTS

83480 * 7/1983 (EP) ................................. 342/357.02

OTHER PUBLICATIONS

Sales Notes, Tripod Data Systems, Inc., Fall 1997.
Sales Flyer for TDS Solo—Real Time Mapping, Tripod Data Systems, Inc.
Sales Flyer for Racal MapPad, Racal NCS, Inc.
Sales brochure, FieldWorker Products Ltd., ©1995–7.
Wireless Telecommunications An Emerging Market for Image–Derived Geodata, Edward A. Jurkevics, GeoTech Business Intellegence Report, Apr. 1999, pp. 1, 7.
Preserving Qatar's Heritage for Future Generations Using GPS, Qassim Al–Ghanim, GEOsurv Chronicle, Issue 6, pp. 3–4.

(List continued on next page.)

*Primary Examiner*—Richard M. Camby
(74) *Attorney, Agent, or Firm*—Townsend and Townsend and Crew LLP

(57) ABSTRACT

A system and method for calculating and storing the location of objects. The system includes a computing device, a global positioning system (GPS) receiver in communication with the computing device, and a range finder in communication with the computing device. The GPS receiver obtains a latitude location and a longitude location of a first position and stores them in the computing device. Next, the GPS receiver obtains a latitude location and a longitude location of a second position and stores them in the computing device. A range finder is then used to locate a distance from the second position to a third position, which is stored in the computing device. The third position is the position of the object for which a location reading is sought. To calculate the latitude and longitude location of the third position, the computing device calculates an azimuth for the third position using the first and second position locations stored in the computing device. Next, the computing device calculates the latitude location and the longitude location of the third position using the latitude location and longitude location of the second position, the distance from the second position to the third position, and the previously calculated azimuth.

30 Claims, 18 Drawing Sheets

OTHER PUBLICATIONS

Sales Flyer for PS4001 Real Time Systems, Pentax Corporation, GPS Division.

Sales Brochure for Racal LandStar, the Differential GPS Service, Racal LandStar Amercas.

TDS Solo Software, Al Pepling, LS, Professional Surveyor, May 1999, pp. 46–48.

Utility Market Embraces ArcFMGIS Solution, ESRI ARC News, Spring 1999, pp. 1, 4.

Advertisement for Turbo–G1, Topcon, ESRI ARC News, Spring 1999, p. 11.

* cited by examiner

Fig. 4b

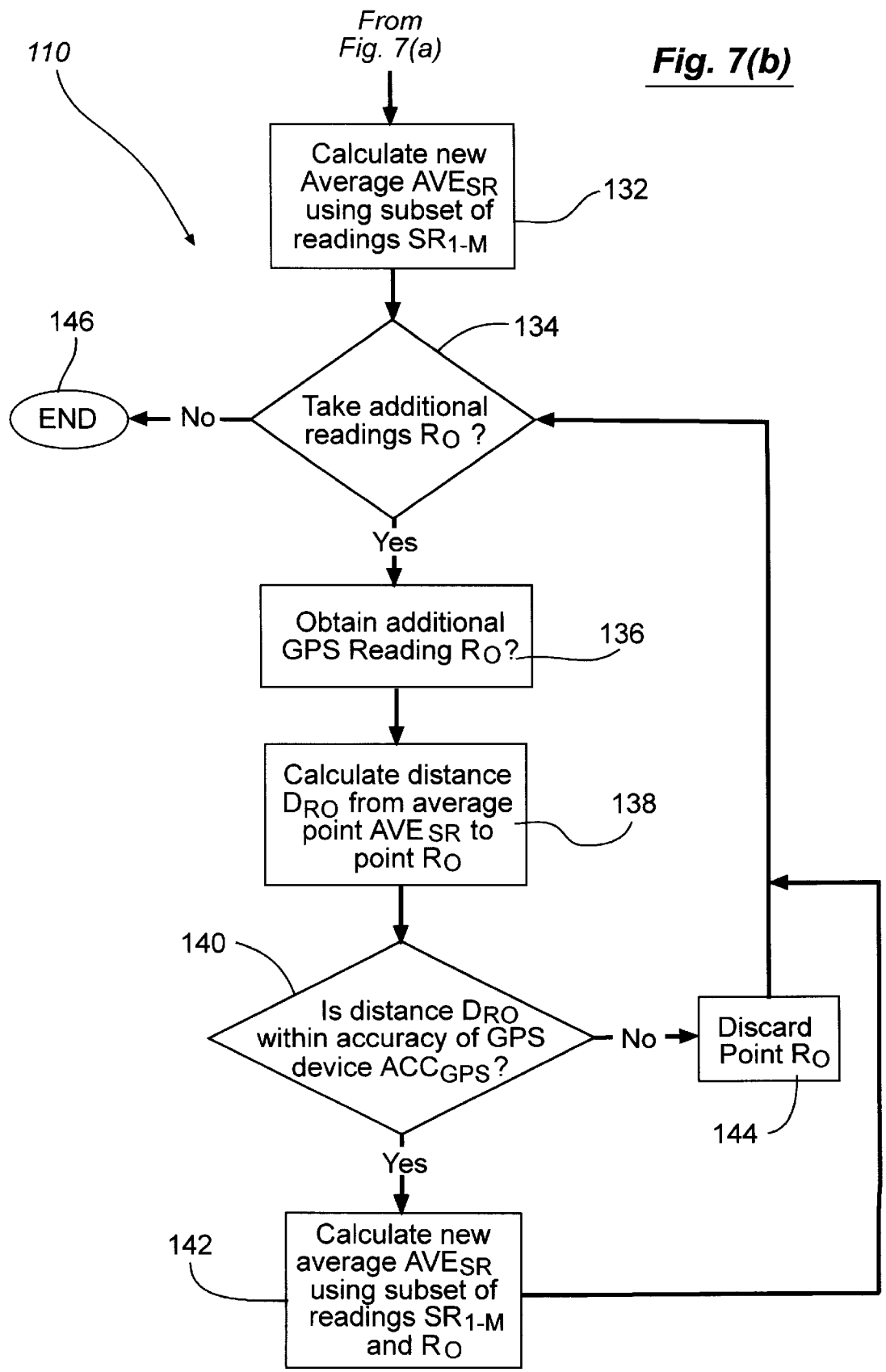

SYSTEMS AND METHODS FOR CREATING MAPS USING GPS SYSTEMS

BACKGROUND OF THE INVENTION

The present invention relates generally to systems and methods for creating maps, and more particularly, to systems and methods for calculating a location of an object using a global positioning system (GPS) receiver and a range finder. In addition, the present invention relates to systems and methods for improving the accuracy of GPS system readings.

The ability to integrate serial devices with notebook computers and new hand held computing devices like the Palm Pilot™, and devices running the Windows CE™ operating system has broadened the potential to create paperless data collection solutions. The hand held computing devices include 3Com's Palm Pilot, Casio Computer LTD's Cassiopeia, Compaq Computer Corporation's PC Companion, Ericsson Mobile Communication's MC12, Hewlett-Packard Co.'s HP Palmtop PC, Hitachi LTD's Handheld PC, LG Electronics' Phenom, NEC Computer Systems Division's MobilePro H/PC, Phillips Electronic's Velo, Sharp Electronics Corporation's Mobilon, and Vadem's Clio. Areas in which automatic data collection is useful include precision farming, asset management, resource management, civil engineering/road building, and the food service industry, to name a few.

For example, with precision farming, large farming operations world-wide can be operated with maximum cost effectiveness if reliable information about variations in the property can be mapped in a timely fashion. Projects requiring such information include the placement of irrigation and drainage systems, soil sampling, crop damage analysis, pathogen detection, and yield mapping for fertilization and pesticide use. In addition, governments and private industries that are concerned about the environment, agriculture, forestry, and mining have an ongoing need to map, inspect, regulate and monitor large areas. It can be very difficult and very time consuming to locate and map objects in these large remote areas.

Another example of an industry in which data collection and mapping is important is the utility field. Most utility companies (e.g., telephone, cable, gas, water and sewage) need to locate and map infrastructure items, such as utility poles, water meters, water lines, gas lines, and the like. The accuracy of these maps can be very important. For example, in the telecommunications industry, companies that need to run coax, fiber optic, or hybrid fiber/coax cable between existing utility poles need accurate location readings and maps of those utility poles.

Currently, these maps are made by individuals obtaining mapping information using manual surveying techniques or expensive and cumbersome surveying equipment utilizing GPS technologies. The GPS systems currently known in the art typically include custom developed data collection and manipulation devices. In addition, to use these systems, the operator must stand outside of a vehicle to obtain the proper location readings. When operators are mapping large areas, it can be extremely time consuming to drive from one mapping point to another, get outside of the car, take a reading, and then get back into the car and drive to the next location. It can be even more time consuming if the data collector is required to walk from one reading point to the next. Therefore, what is needed is an inexpensive easy to use system and method for obtaining and storing mapping information.

In addition, the accuracy of global positioning systems (GPS) is affected by a number of external influences. For example, atmospheric/ionospheric conditions, ephemeris error, receiver error, satellite clock error, multi-path error, and selective availability introduced by the Department of Defense all can affect GPS accuracy. Because of these errors, the typical accuracy of a good GPS receiver is about 60 to about 100 feet. The existence of differential corrections or differential GPS (DGPS) helps improve the accuracy to about 20 centimeters for good quality GPS receivers. Lower quality DGPS devices can have accuracies between about 1 to about 3 meters.

When recording GPS readings, it is not uncommon to see significant drift in the readings due to the above mentioned influences, even when using DGPS systems. Thus, what is need is a system and method for obtaining more accurate location readings using a GPS system, by reducing the effect of the above mentioned influences.

SUMMARY OF THE INVENTION

According to the invention, a system and method for calculating and storing the location of objects. The system includes a computing device, a global positioning system (GPS) receiver in communication with the computing device, and a range finder in communication with the computing device. In accordance with the present invention, the GPS receiver obtains a latitude location and a longitude location of a first position and stores them in the computing device. Next, the GPS receiver obtains a latitude location and a longitude location of a second position and stores them in the computing device. A range finder is then used to locate a distance from the second position to a third position, which is stored in the computing device. The third position is the position of the object for which a location reading is sought. To calculate the latitude and longitude location of the third position, the computing device calculates an azimuth for the third position using the first and second position locations stored in the computing device. Next, the computing device calculates the latitude location and the longitude location of the third position using the latitude location and longitude location of the second position, the distance from the second position to the third position, and the previously calculated azimuth.

To calculate the azimuth for the third position, the system first calculates a preliminary azimuth from the first position to the second position using the latitude and longitude locations of the first and second positions. Next, the system adds 90 degrees to the preliminary azimuth if the third position is to the right of the second position or the system subtracts 90 degrees from the preliminary azimuth if the third position is to the left of the second position.

In accordance with another aspect of the present invention, the GPS receiver can be configured to obtain and store in the computing device altitude locations for the first and second positions. Also, when measuring the distance from the second position to the third position, the range finder may obtain and store in the computing device an inclination angle from the second position to the third position. The computing device then can calculate an altitude of the third position using the altitude of the second position and the inclination angle from the second position to the third position.

In accordance with one embodiment of the present invention, the computing device may comprise a handheld computing device running the Windows CE™ operating system.

In accordance with another embodiment of the present invention, a system for improving the location measuring accuracy of a GPS receiver by calculating an average measured location. The system comprises a computing device and a GPS receiver in communication with the computing device. The system is configured to calculate an average measured location by the computing device obtaining a GPS receiver accuracy $ACC_{GPS}$ of the GPS receiver. The GPS receiver obtains a plurality of GPS location readings $R_{1-N}$ at a position, and stores the GPS location readings $R_{1-N}$ in the computing device. The computing device calculates a first average location $AVE_R$, which is an average of the plurality of GPS location readings $R_{1-N}$. The computing device then obtains a subset of GPS location readings $SR_{1-M}$ from the plurality of GPS location readings $R_{1-N}$ which are within the accuracy $ACC_{GPS}$ of the GPS receiver by subtracting each one of the plurality of GPS location readings $R_{1-N}$ from the average position $AVE_R$ to get a distance $D_R$ that each one of the plurality of GPS location readings $R_{1-N}$ are from the average position $AVE_R$. The computing device then includes in the subset of readings $SR_{1-M}$ each one of the plurality of GPS location readings $R_{1-N}$ that has a distance $D_R$ less than said accuracy $ACC_{GPS}$ of the GPS receiver. The computing device then calculates a new average location $AVE_{SR}$ which is an average of the subset of location readings $SR_{1-M}$.

The system can be configured to continue to calculate a new average location as additional GPS readings are taken. In accordance with this aspect of the present invention, the GPS receiver obtains an additional GPS location reading $R_O$ at the particular position being measured. The computing device then determines if the additional GPS location reading $R_O$ is within the accuracy $ACC_{GPS}$ of the GPS receiver by subtracting the additional GPS location reading $R_O$ from said new average position $AVE_{SR}$ to get a distance $D_{RM}$ from the average position $AVE_{SR}$. If the additional GPS reading $R_O$ has a distance $D_{RM}$ less than said accuracy $ACC_{GPS}$ of the GPS receiver, the computing device calculates a new average location $AVE_{SR}$ which is an average of the subset of location readings $SR_{1-M}$ and the additional GPS location rating $R_O$.

In accordance with one embodiment of the present invention, a new average location $AVE_{SR}$ is calculated until at least 60 GPS location readings are used to calculate the new average location $AVE_{SR}$.

A more complete understanding of the present invention may be derived by referring to the detailed description of preferred embodiments and claims when considered in connection with the figures, wherein like reference numbers refer to similar items throughout the figures.

BRIEF DESCRIPTION OF THE DRAWINGS

FIGS. 4a–4f are screen shots illustrating a method of calculating the location of objects;

DESCRIPTION OF THE SPECIFIC EMBODIMENTS

Object Location Calculation and Map Generation

As one skilled in the art will appreciate, it is important for many businesses and/or agencies to create maps to keep track of assets or know the location of certain objects. For example, fire departments create maps of neighborhoods so that they can respond to 9-1-1 calls in a quicker manner, and the utilities often create maps which show the location of utility assets such as utility poles, water meters, etc. Currently there exist systems which can calculate object locations using differential global positioning systems (DGPS). These systems involve one or more known positions (as measured with the DGPS) and one or more range finder generated distances between the known positions and the unknown position. Triangulation typically then is used to calculate the unknown position using the 2 DGPS positions and the 2 range finder generated distances. This method doubles the number of range finder readings needed, and can make it complicated to track the readings being used to calculate the different positions.

Some range finders will include an azimuth measuring device, such as a compass, to give a directional location position relative to the position from which the distance measure is being taken. However, in many circumstances magnetic fields and other factors can cause the azimuth measuring capability of a range finder to be inaccurate. For example, when trying to take range measurements from within a car, the magnetic fields generated by different components in the car will cause the compass to have great error. The present invention provides systems and methods for calculating the position of an object using one distance reading and two GPS position locations. The two GPS positions are used to calculate the azimuth or direction of the object being measured from one of the position locations measured using the GPS system.

Figure 1:
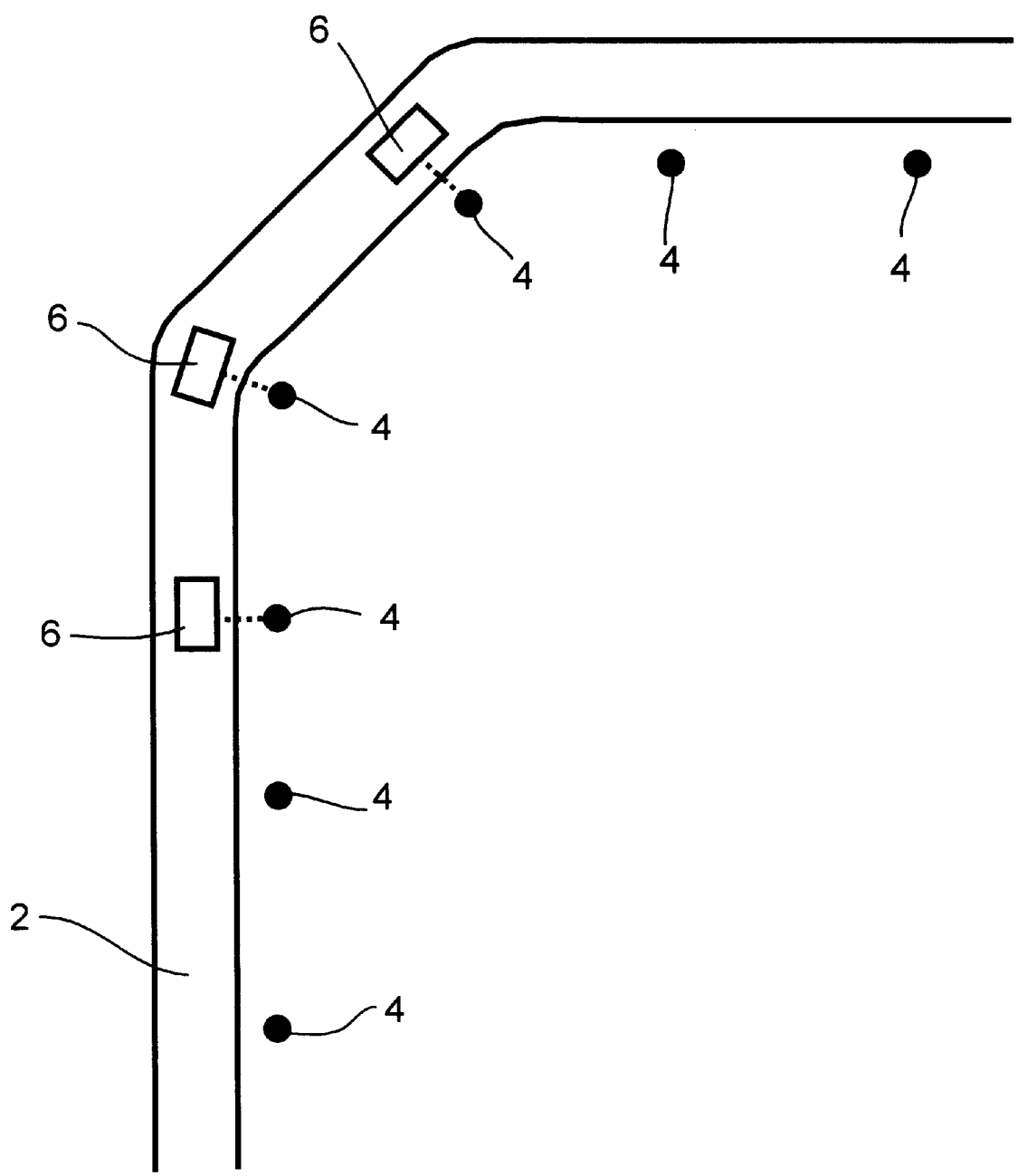
FIG. 1 is a diagram illustrating how a person can measure the location of utility poles while driving down the street.

Referring now to FIG. 1, a street 2 is shown having a plurality of utility poles 4 positioned along street 2. In accordance with one embodiment of the present invention, a person riding in a car 6 can take location measurements of utility poles 4 as the person drives along street 2. As discussed briefly above, the method involved in taking the location measurements of utility poles 4 includes taking two GPS location measurements at two different locations and then using a range finder to determine a distance that the unknown position is from a second measured position.

Figure 2:
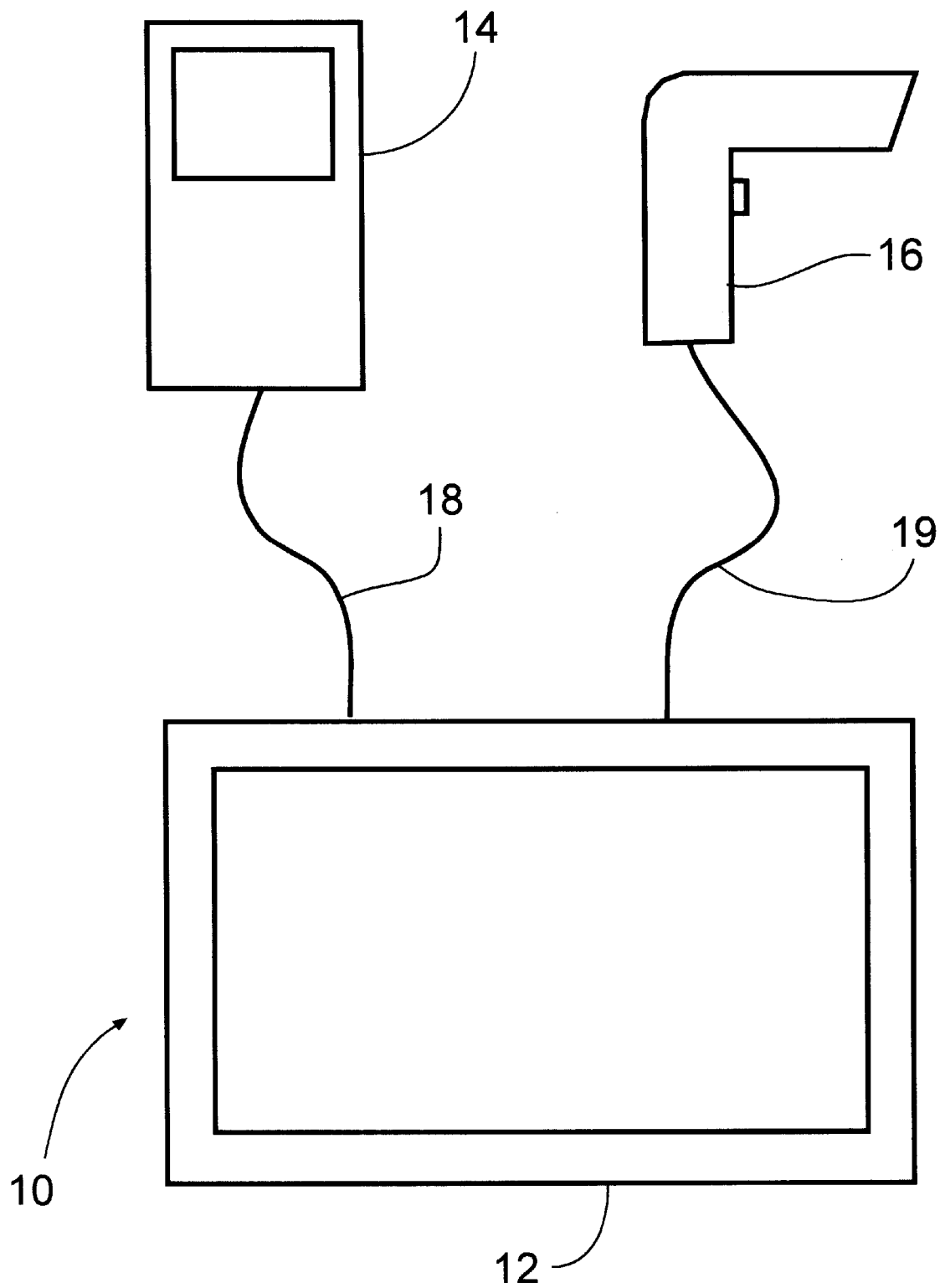
FIG. 2 is a diagram illustrating an object measuring system.

Referring now to FIG. 2, a system for calculating and storing object locations is shown. More particularly, system 10 includes a computing device 12, a GPS receiver 14, and a range finder 16. Computing device 12 may comprise any suitable computing device currently known or hereinafter developed. However, in accordance with one embodiment of the present invention, computing device 12 preferably comprises a portable computing device, such as a notebook computer or a handheld computing device running, for example, the Windows CE™ operating system. Examples of Windows CE™ devices include Casio Computer Ltd.'s Cassiopeia, Compaq Computer Corporation's The Compact PC Companion, Ericsson Mobile Communication's MC12, Hewlett-Packard Co.'s HP Palmtop PC, Hitachi LTD's Handheld PC, LG Electronics' Phenom, NEC Computer Systems Division's MobilePro H/PC, Phillips Electronic's Velo, Sharp Electronics Corporation's Mobilon, or Vadem's Clio. However, the present invention is not limited to these devices.

GPS unit 14 may comprise any suitable GPS receiver, including a differential GPS (DGPS) receiver, and preferably is connected to computing device 12 via a suitable communication connection 18; for example, a serial port connection, parallel port connection, SCS connection, Universal Serial Bus, Fivewire, Fibre Channel, or the like. Similarly, range finder 16 may comprise any suitable range finder currently known in the art, and also preferably is connected to computing device 12 via a suitable communication connection 19.

While system 10 shows computing device 12, GPS receiver 14 and range finder 16 as being separate components, one skilled in the art will appreciate that the system could be configured as a single device, or 2 or more of the components could be configured together as a single component; for example, the GPS receiver and the computing device could be a single unit. Therefore, the system is not limited to the illustrated embodiment.

Figure 3:
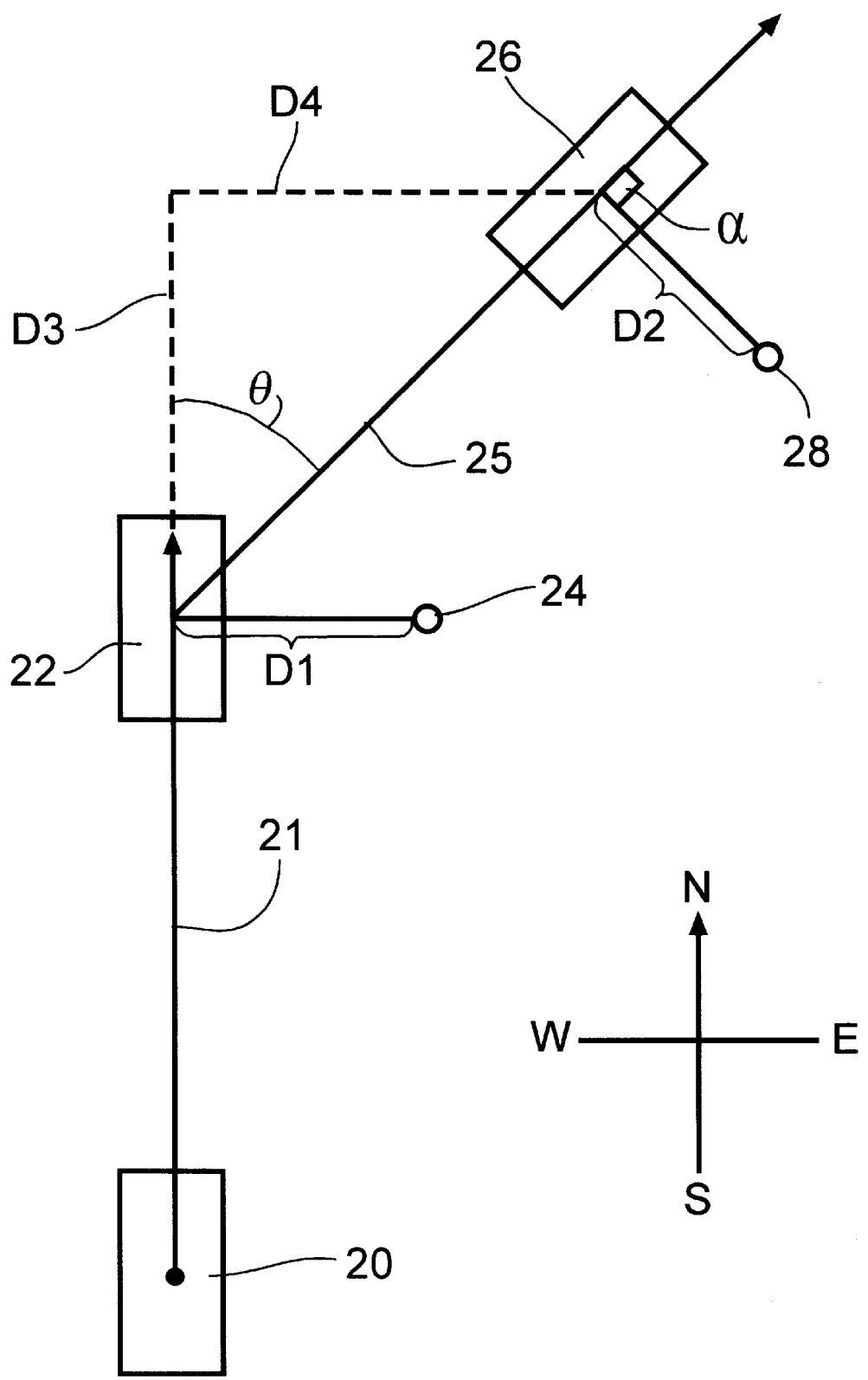
FIG. 3 is a diagram illustrating a method of calculating the location of objects.

Referring now to FIG. 3, a geometric drawing illustrating a method of the present invention for calculating the location of an object using a GPS receiver and a range finder will now be described. As one skilled in the art will appreciate, system 10 (FIG. 2), or other suitable systems may be used in accordance with the present method.

Figure 4A:
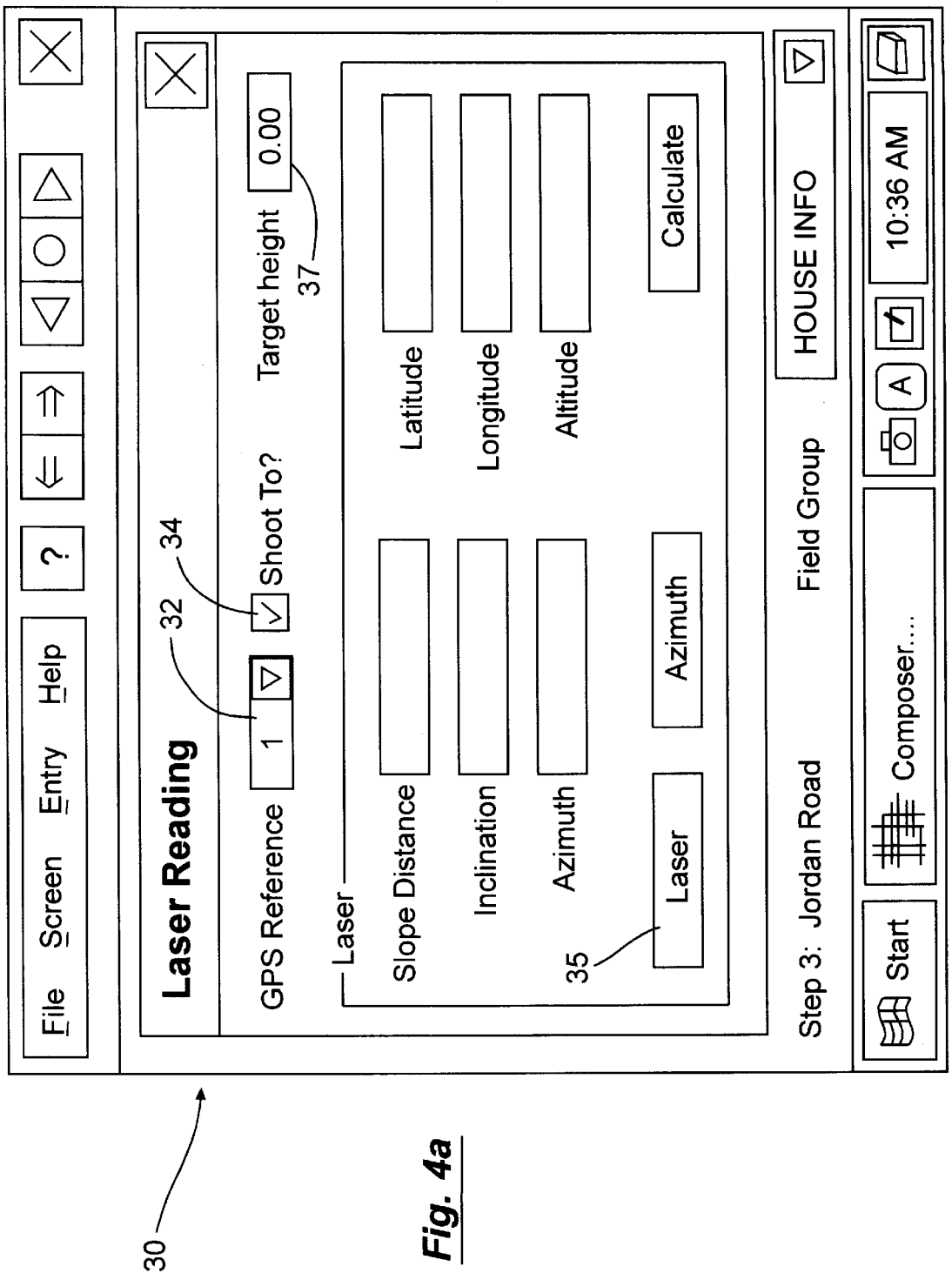
Figure 4B:
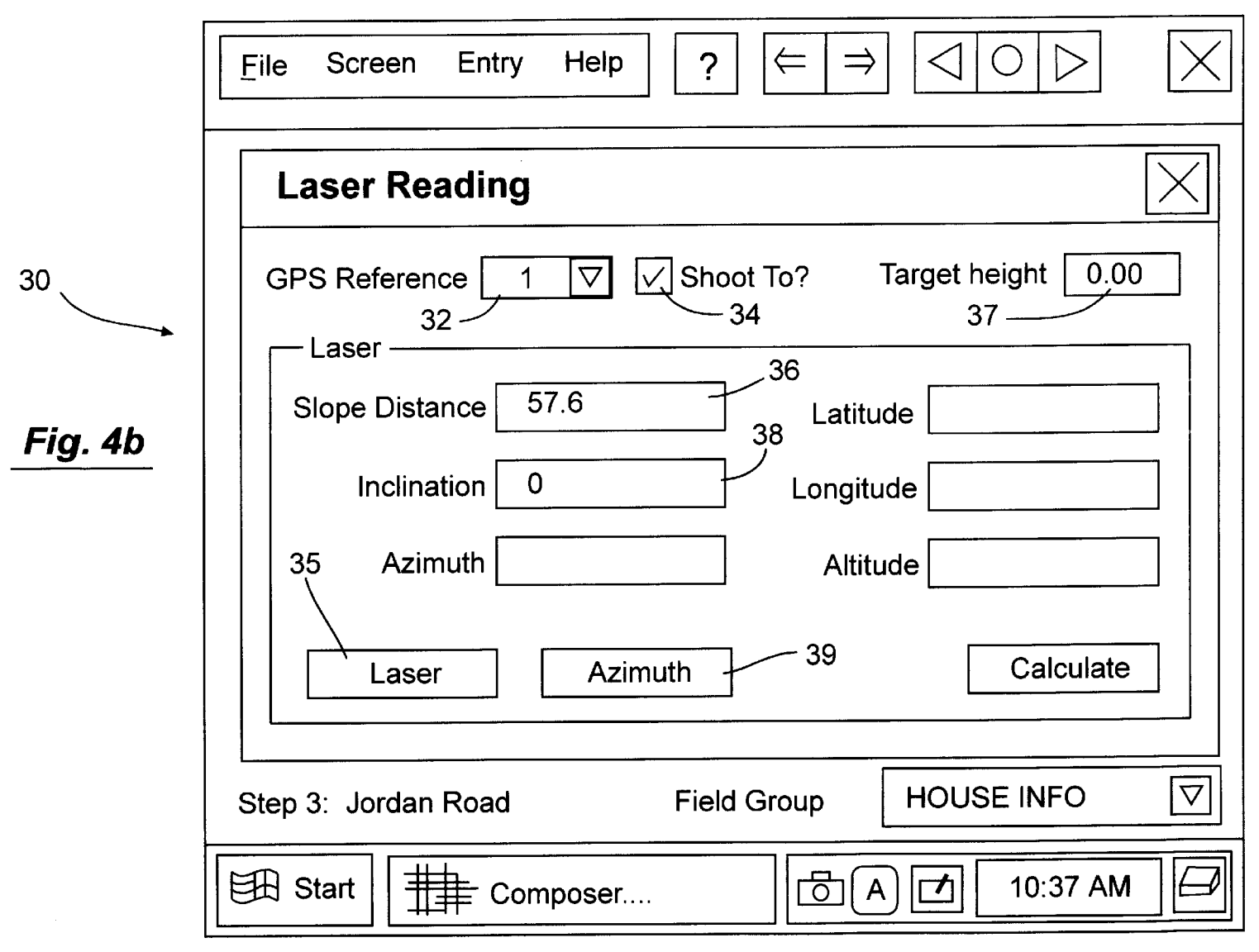
Figure 4C:
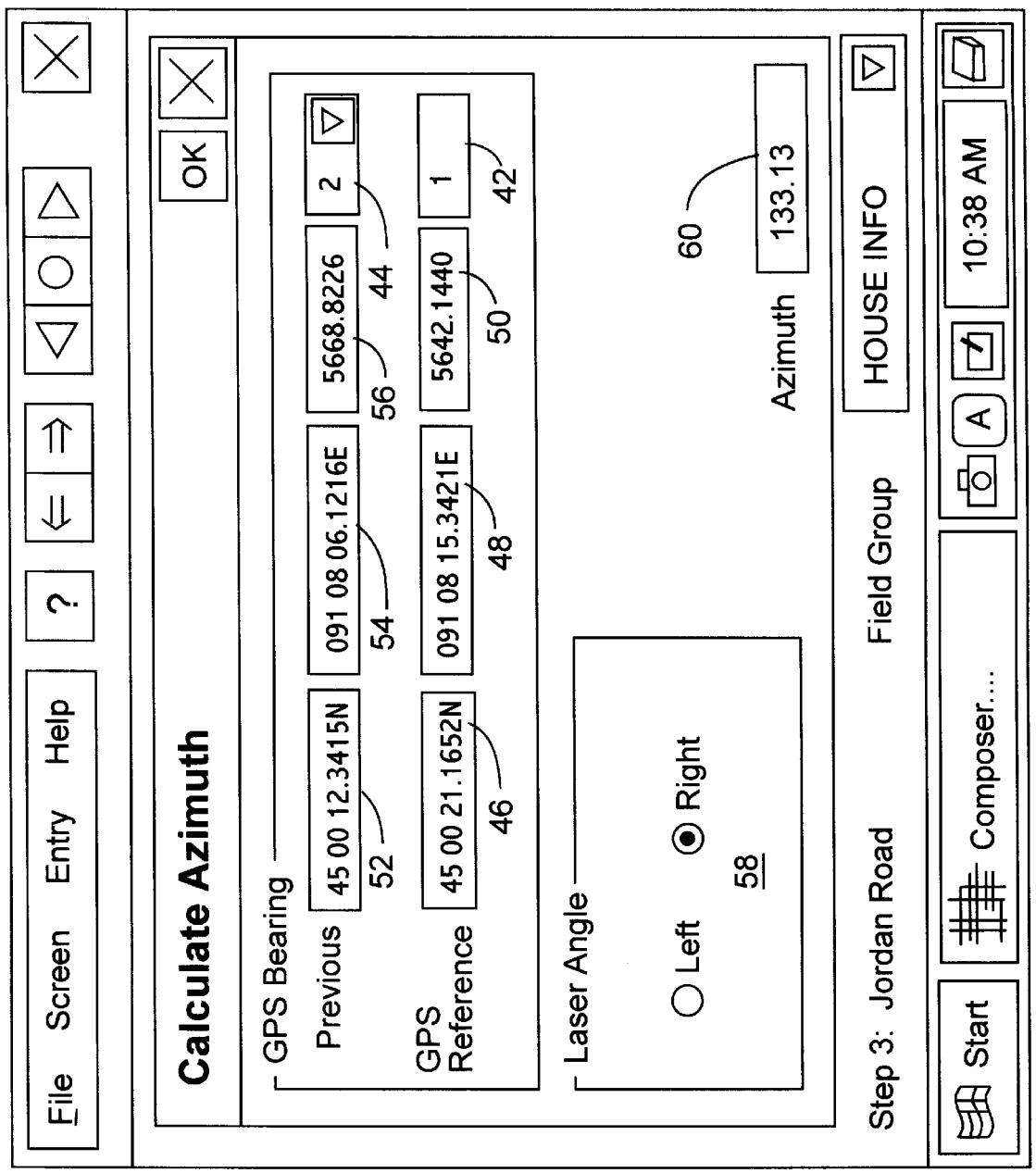

To calculate location coordinates for a position 24 in accordance with one embodiment of the present invention, a GPS receiver 14 first is used to obtain a location measurement of a first position 20 (referred to in FIG. 4c as "Previous"). Preferably, the location information of position 20 includes latitude, longitude and altitude readings. In accordance with this particular example, the latitude location of position 20 is 45° 00' 01.2121" N, the longitude of position 20 is 091° 08' 06.1216" E, and the altitude is 5,623.2814 feet. After obtaining the location at position 20, the location at a second position 22 (referred to in FIGS. 4a–4e as "GPS Reference") is determined using a GPS receiver (e.g., GPS receiver 14). In accordance with this example, the location of position 22 is directly north of position 20 and has a latitude measurement of 45° 00' 12.3415" N, a longitude measurement of 091° 08' 06.1216" E, and an altitude measurement of 5,668.8226 feet.

Next, range finder 16 is used to determine a distance D1 and an inclination angle from position 22 to position 24. In this particular example, distance D1 is 12.2 meters. After distance D1 is determined, an azimuth for position 24 is calculated.

To calculate the azimuth for position 24, the azimuth location of second position 22 from first position 20 first is calculated. With this particular example, because second position 22 is due north of first position 20, the azimuth between the two positions is zero (0). Next, in accordance with one embodiment of the present invention, it is assumed that distance D1 is obtained using a range finder located at a right angle or 90° from position 24. That is, position 24 is 90° from position 22 as it sits along the direction line 21 from position 20 to position 22. Thus, to calculate the azimuth for position 24, 90° is added to the azimuth between positions 20 and 22. If position 24 was to the left of position 22, 90° would be subtracted from the azimuth between positions 20 and 22. With this particular example, since the azimuth between positions 20 and 22 is zero (0), the azimuth for position 24 is 90°. Finally, the latitude and longitude readings of position 22, and the azimuth for position 24 is used to calculate the longitude and latitude readings of position 24. For this particular example, the longitude and latitude readings for position 24 are 12.2 meters east of 091° 8' 06.1216" E and 45° 00' 12.3415" N, respectively. As illustrated the new longitudinal location is 12.2 meters east of the longitude coordinate 091° 8' 06.1216" E. As one skilled in that art will appreciate, the conversion of the 12.2 meters to a new longitudinal or geoditic value is done by well known mathematical methods. Therefore, this conversion method will not be disclosed in detail herein. Also, as discussed in more detail below, the inclination angle between position 22 and position 24, and the altitude at position 22 can be used to calculate the altitude at position 24.

Still referring to FIG. 3, as well as FIGS. 4a–4f, a second example of the method for calculating coordinates of a location using a GPS receiver and a range finder is illustrated. In accordance with this particular example, the location coordinates for position 28 (FIG. 3) will be calculated. As with the first example, a first position location is determined. In accordance with this particular example, the first location is position 22. As mentioned above, position 22 has the following coordinates: latitude 45° 00' 12.3415" N; longitude 091° 08' 06.1216" E; and altitude 5,668.8226 feet. Next, a GPS receiver is used to obtain location information for second position 26. As with first position 22, this information is communicated to and stored in a computing device 12. In accordance with this particular example, the location coordinates for position 26 are: latitude 45° 00' 21.1652" N; longitude 091° 08' 15.3421" E; and altitude 5642.1440 feet.

After determining the location of position 26, a range finder, for example range finder 16, is used to determine distance and inclination from position 26 to the objects located at position 28.

As illustrated on FIG. 4a, a screen 30 entitled "Laser Reading" may be activated on computing device 12. On screen 30, the user can enter or select the reference point (i.e., second position) from which the distance reading is being taken (field 32), and whether the range finder is shooting to object 28 or from object 28 (field 34). The system will automatically take these measurements, store them and then display them on screen 30. In accordance with a preferred embodiment of the present invention, the laser range finder preferably will determine a distance (field 36), from position 26 (the GPS Reference Position) to position 28 (the position for which location coordinates are being calculated) a target height (field 37) of position 29, and an inclination angle (field 38) between positon 20 and position 28, (see FIG. 4b). In this particular example, the distance is 57.6 meters, the target height is 0 meters, thus giving an inclination angle of 0 degrees.

After distance D1 from position 26 to position 28 is measured, the azimuth of position 28 is determined. In accordance with this aspect of the invention, the user selects azimuth button 39, which brings up a calculate azimuth screen 40 on computing device 12 (FIG. 4c). As shown on FIG. 4c, the latitude, longitude and altitude for the positions used to calculate the azimuth (i.e., positions 22 and 26) are illustrated. Position 26 is referred to as "GPS Reference" on FIG. 4c and position 22 is referred to as "Previous" on FIG. 4c.

In this particular example, the location of position 26 (GPS Reference) is:

Latitude 45° 00' 21.1652" N (see field 46, FIG. 4c)
Longitude 091° 08' 15.3421" E (see field 48, FIG. 4c)

Altitude 5642.1440 feet (see field 50, FIG. 4*c*)

Similarly, the location of position 22 (Previous Position) is:

Latitude 45° 00' 12.3415" N (see field 52, FIG. 4*c*)

Longitude 091° 08' 06.1216" E (see field 54, FIG. 4*c*)

Altitude 5668.8226 feet (see field 56, FIG. 4*c*)

Next, angle θ (FIG. 3) is calculated using the following formula:

$$\theta = \arctan(D3/D4) \text{ where:}$$

D3=latitude of position 26−latitude of position 22
D4=longitude of position 26−longitude of position 22.

$$\theta = \arctan((45°\ 00'\ 21.1652"\ N-45°\ 00'\ 12.3415"\ N)/(091°\ 08'\ 15.3421"\ E-091°\ 08'\ 06.1216"\ E))$$

$$\theta = \arctan(8.82"/9.22") = 43.73°$$

After the azimuth angle θ between position 22 and position 26 is calculated, the azimuth of position 28 is determined. As discussed above, it is assumed that distance D2 is measured using a range finder which is located at a 90° angle from the direction of line 25. That is, angle α is 90°. In this manner, the azimuth for location 28 is calculated using the following formula:

$$\text{aziumth} = \theta + \alpha = 43.73° + 90° = 133.73°$$

Figure 4D:
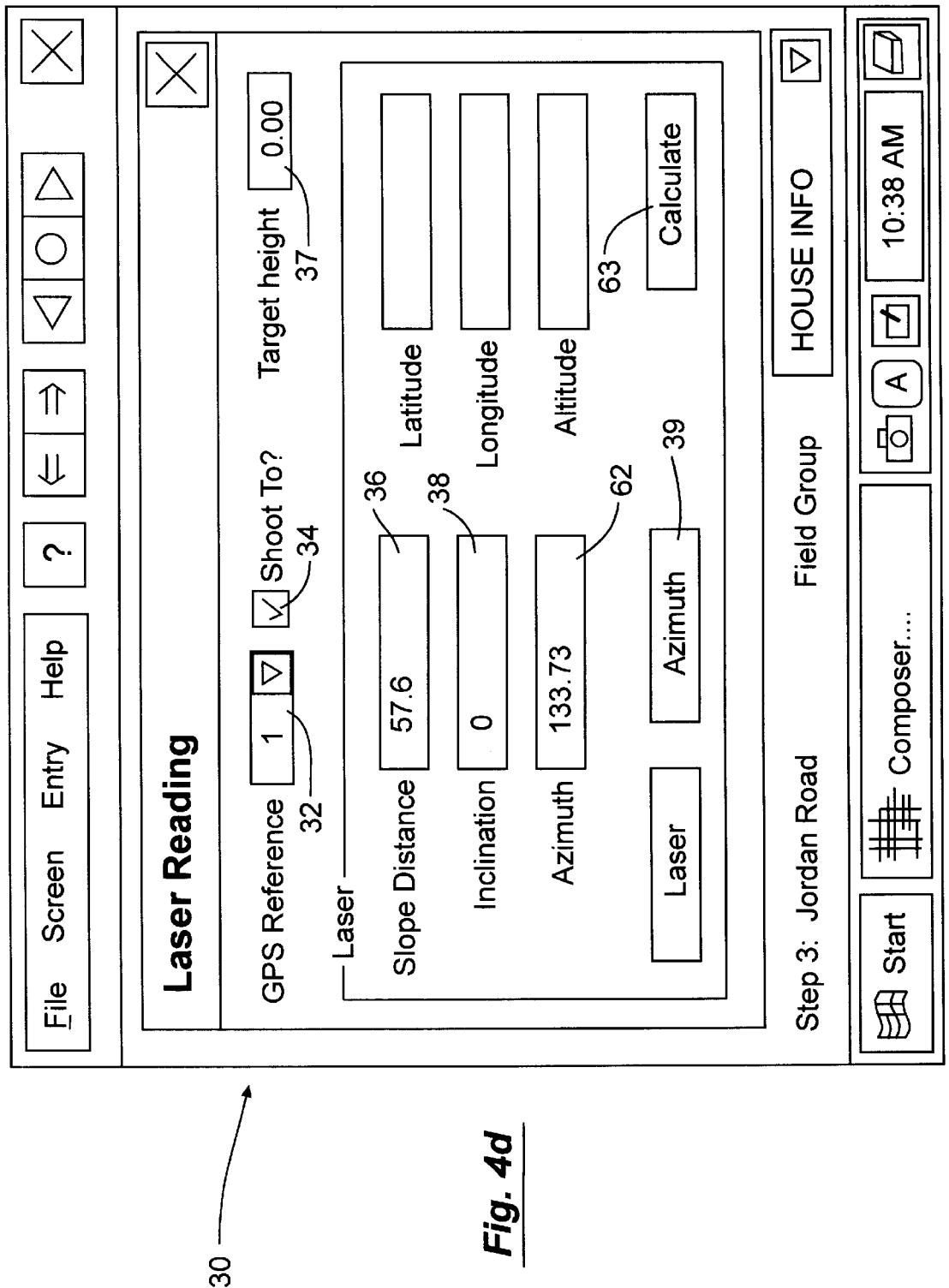

In this particular example, the angle α (90°) is added to the angle θ (43.73°) because position 28 is to the right of position 26. However, as one skilled in the art will appreciate, if position 28 was left of position 26, the angle α would be subtracted from the angle θ. Box 58 on screen 40 (FIG. 4*c*) allows the operator of the device to input the direction position 28 is to position 26 (i.e., to the right or left). After the azimuth for position 28 is calculated, it is displayed in box 60 on screen 40 (FIG. 4*c*) and box 62 on screen 30 (FIG. 4*d*).

After the azimuth is determined for position 28, distance D2 and the azimuth is converted to latitude, longitude and altitude values. To do this, the user of computing device 12 can select and/or activate calculate button 63 on screen 30, which causes computing device 12 to perform the conversion. As one skilled in the art will appreciate, the calculation of the location of position 28 is simple geometry and trigonometry. That is, to obtain the change in latitude and longitude, the following calculations are made:

$$\text{latitude change} = D2(\sin(\theta))E = 57.6\ m(\sin(43.73))E = 39.82\ mEast$$

$$\text{longitude change} = D2(\cos(\theta))S = 57.6\ m(\cos(43.73))S = 41.62\ mSouth$$

After performing these calculations, the change in latitude and longitude are expressed in meters. These values can be stored in meters or feet or converted to geodetic values, such as degrees, minutes and seconds, and then stored. If converted to degrees, minutes and seconds form, computing device 12 preferably is programmed to perform these conversions. These conversion calculations are well known in the art, and therefore, will not be described in detail herein. Also, the values can be displayed in boxes 64 and 66 (FIG. 4*c*) in either meters, feet, or geodetic values.

In addition to calculating latitude and longitude for position 28, the altitude of position 28 can also be determine. As one skilled in the art will appreciate, the inclination angle (box 38) and distance D2 (box 36) can be used to calculate the change in altitude. In this particular example, the inclination angle is zero (0), and therefore, there is no change in altitude between position 26 and 28. In accordance with the illustrated embodiment, the altitude is stored and displayed in box 68.

Figure 4E:
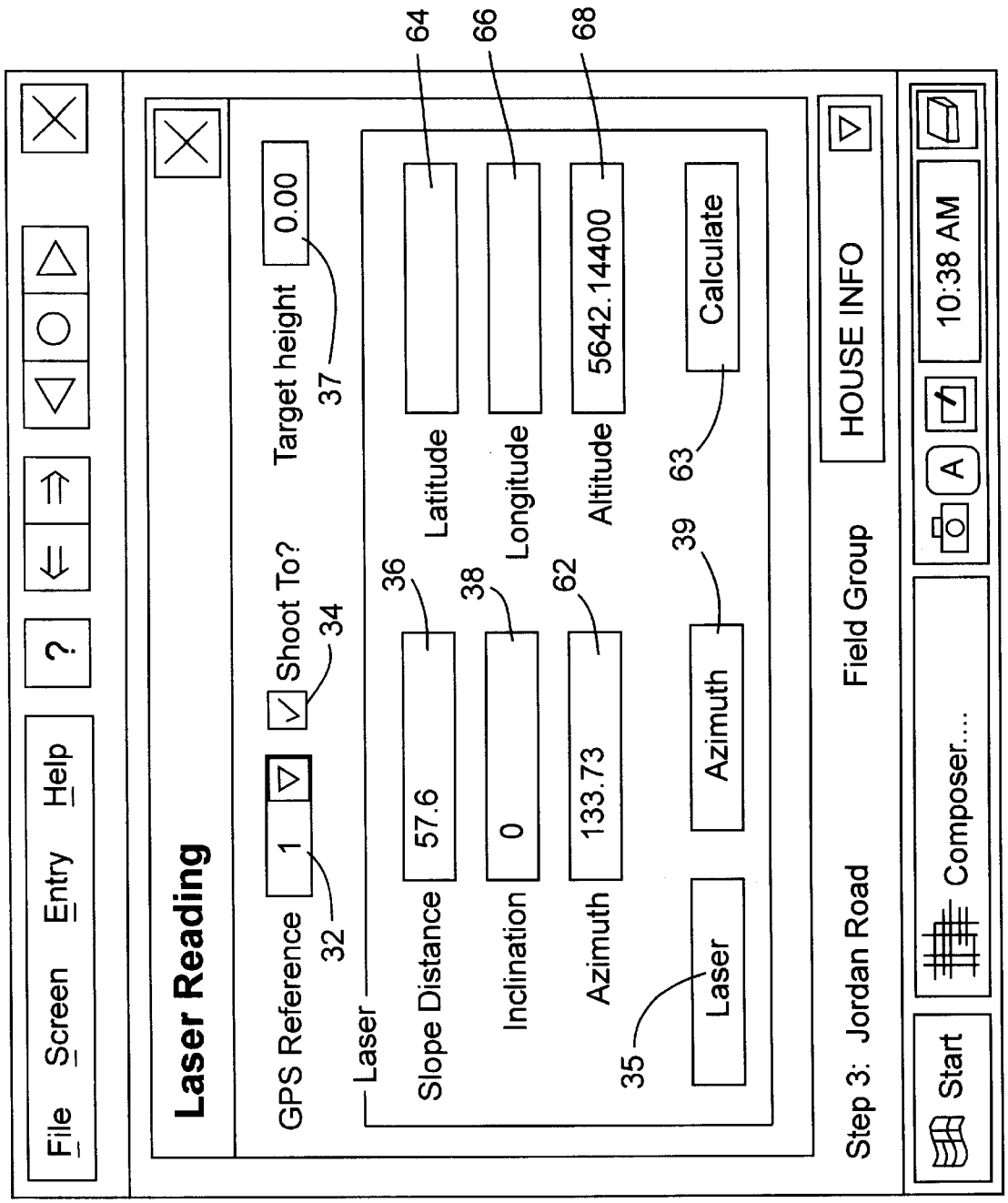
Figure 4F:
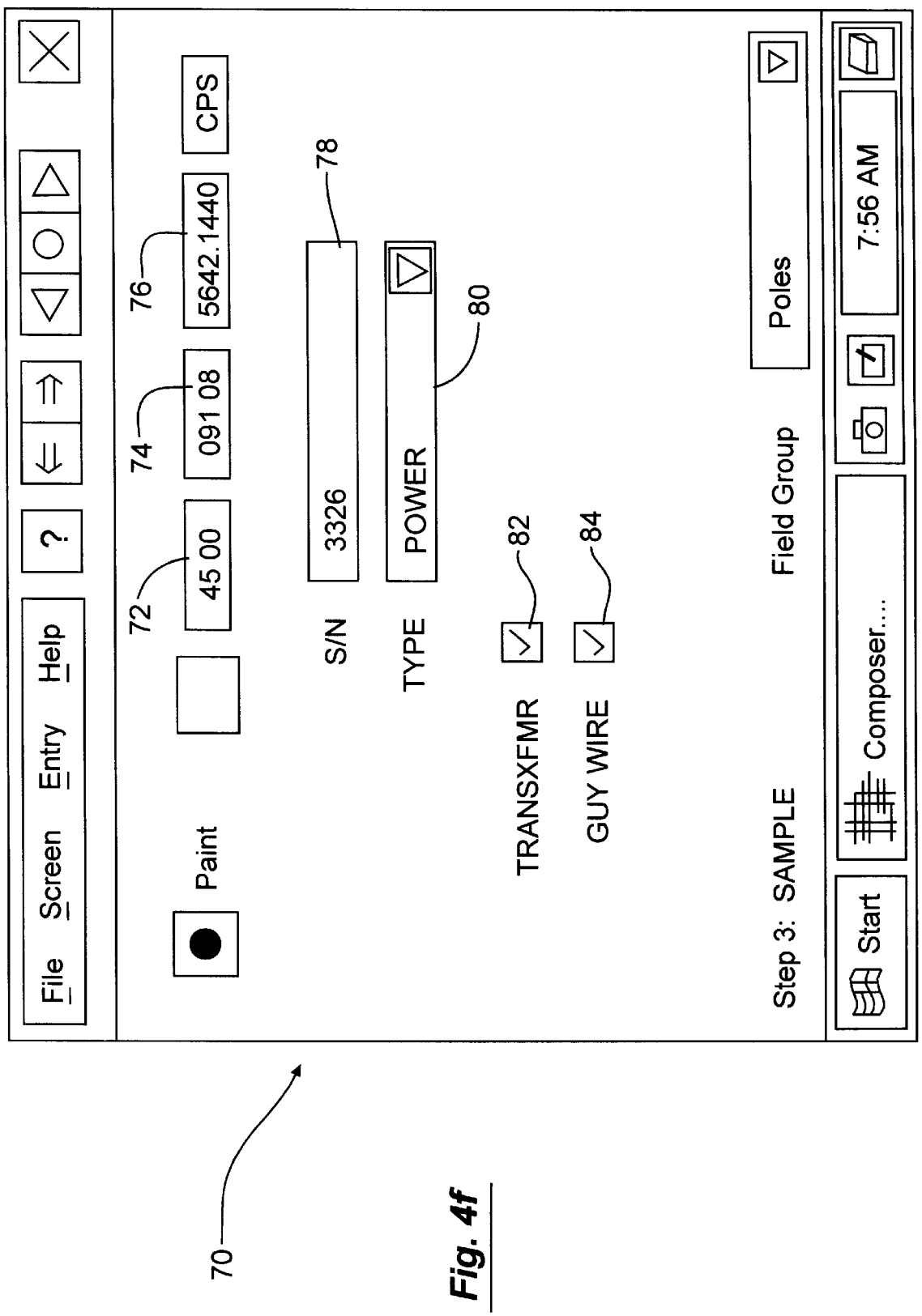

As illustrated in FIG. 4*e*, the location values (latitude, longitude and altitude) for the object are displayed on screen 70. In addition to the location values, screen 70 allows the user to enter additional information about the object located at the position being measured. In accordance with the example used herein, the object at position 28 is a utility pole, and the additional information about the pole may include pole serial number (box 78), pole type (box 80), whether the pole includes a transformer (box 82), whether the pole includes a guy wire (box 84), or the like. One skilled in the art will appreciate that screen 70 is merely an example of one embodiment of the invention, and that any screen may be designed for input of any information about any number of different objects or object types. Thus, the present invention in not limited to the illustrated embodiment.

After obtaining the location values or coordinates and information for the objects 4 (FIG. 1) being measured, the stored values and information can be converted into a map. The map building process is well known in the art, and thus, will not be described herein.

GPS Filtering

The accuracy of global positioning systems (GPS) is affected by a number of external influences. For example, atmospheric/ionospheric conditions, ephemeris error, receiver error, satellite clock error, multi-path error, and selective availability introduced by the Department of Defense all can affect GPS accuracy. Because of these errors, the typical accuracy of a good GPS receiver is about 60 to about 100 feet. The existence of differential corrections or differential GPS (DGPS) helps improve the accuracy to about 20 centimeters for good quality GPS receivers. Lower quality DGPS devices can have accuracies between about 1 to about 3 meters.

When recording GPS readings, it is not uncommon to see significant drift in the readings due to the above mentioned influences, even when using DGPS systems. The present invention provides a filtering method that obtains an average GPS reading over time. The filtering method discards spurious readings, thus reducing the effect of the above mentioned influences.

Figure 5:
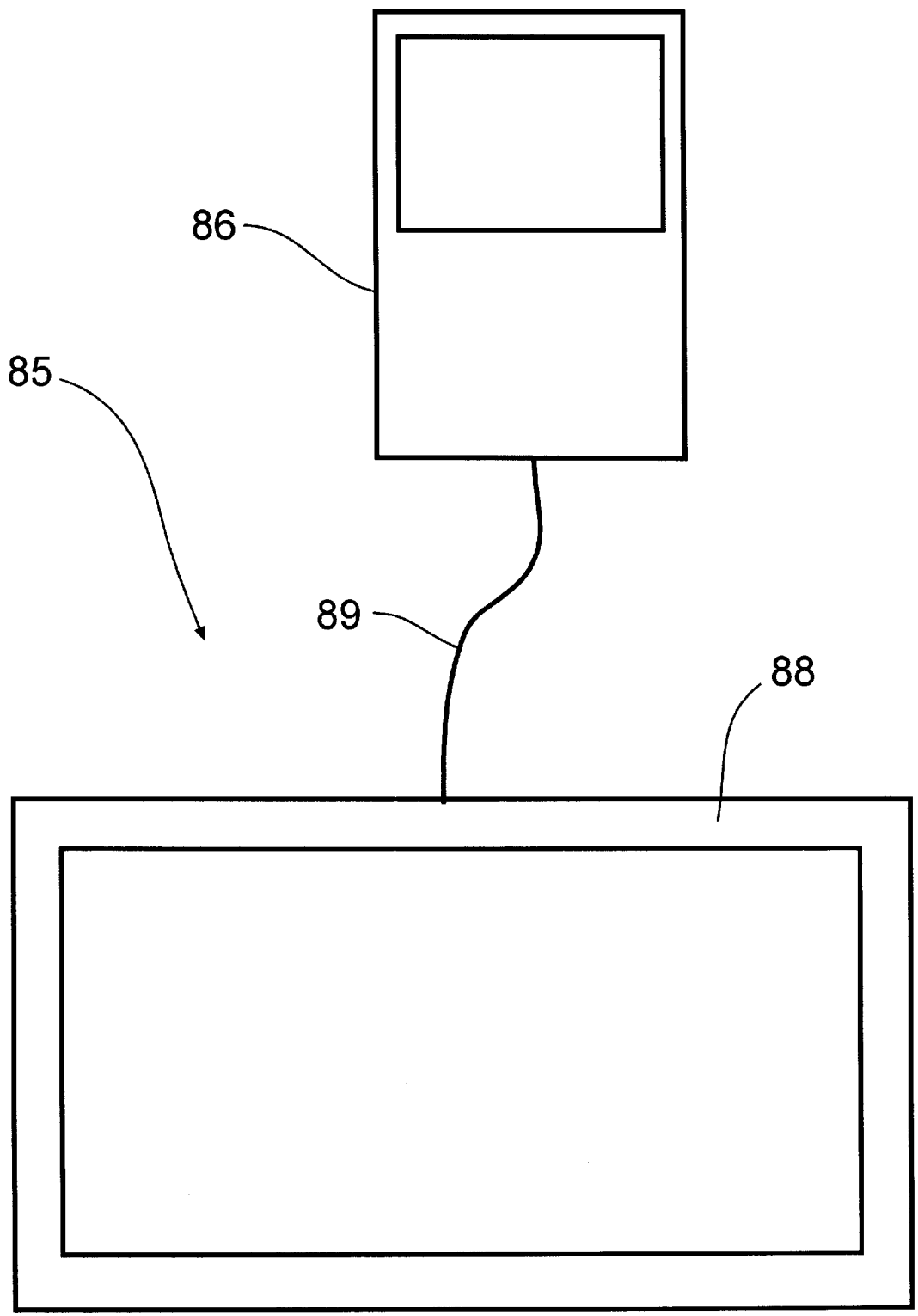
FIG. 5 is a diagram illustrating a GPS filtering system.

Referring now to FIG. 5, a system 85 is shown which can perform the filtering method. In accordance with one embodiment of the present invention, system 85 preferably comprises a computing device 88 and a GPS receiver 86 in communication with computing device 88 via a suitable communication link 89. Computing device 88 may comprise any suitable computing device currently known in the art or hereinafter developed. However, in accordance with one embodiment of the present invention, computing device 88 preferably comprises a portable computing device, such as a device running the Window CE™ operating system.

GPS receiver 86 may comprise any suitable GPS device, including DGPS devices. GPS receiver 86 may be connected to computing device 88 via any suitable communication connection, including, but not limited to, serial, parallel, SCSI, fiber channel, PCI, firewire, infrared, or microwave connections. Also, while one embodiment of the present invention is disclosed herein as having separate computing and GPS devices, one skilled in the art will appreciate that the GPS receiver and the computing device may be configured in to a single device. Therefore, the present invention is not limited to the embodiment illustrated in FIG. 5.

When taking measurements using a GPS device, one typically will occupy a position for a period of time, taking a series of readings, and then averaging those readings to obtan an average, and thus, more accurate reading. Normally, the majority of the readings will fall within a stated accuracy of a GPS device. For example, if the GPS device is accurate to within about 5 meters, the majority of the readings will be contained within a circle having a radius of about 5 meters. Occasionally, however, readings, which are more dramatically affected by the external conditions, can occur. These "wild readings" will fall outside the radius of the accuracy of the GPS device, thus affecting the accuracy of the average of the readings.

Figure 6:
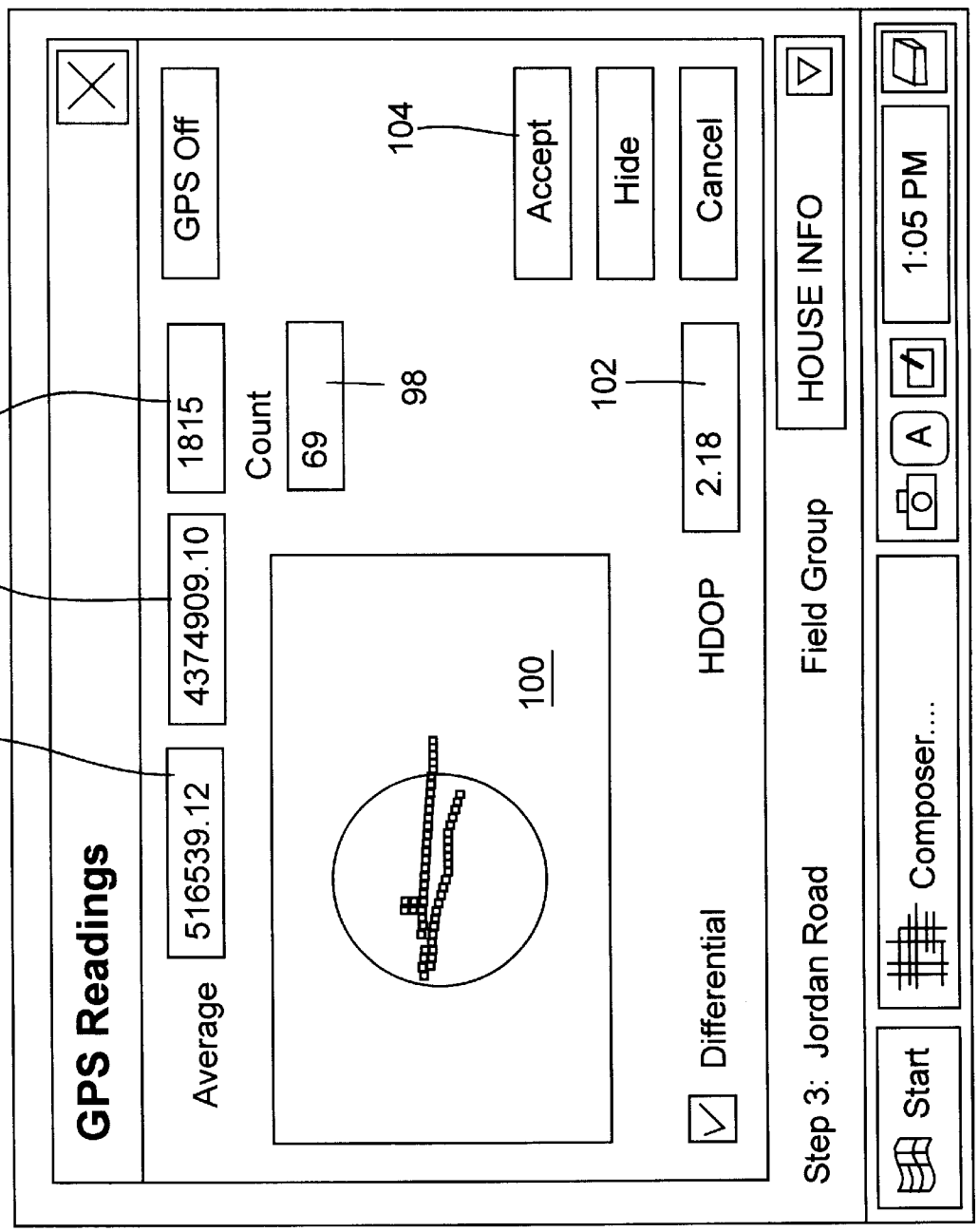
FIG. 6 is a screen shot illustrating a method for improving the reading accuracy of a GPS receiver.

Referring now to FIG. 6, a screen 90 is shown which illustrates this averaging process. In accordance with the illustrated embodiment, screen 90 includes box 92 showing the average latitude readings, box 94 showing the average longitude readings, and box 96 showing the average altitude readings. In addition, box 98 shows the total number of readings used to obtain the average readings, and box 100 gives a graphical depiction of where the readings fall within the accuracy radius of the GPS device. In addition, screen 90 may include a box 102 which shows the horizontal dilution of precision (HDOP), a value which gives a determination of the accuracy of the GPS readings based on the location of the satellites with respect to the GPS device. As one skilled in the art will appreciate, if the HDOP value gets above a certain number, the accuracy of the GPS device may be degraded to the point of unworkability.

As illustrated in box 100 of screen 90, and as discussed above, some of the readings may fall outside the accuracy radius of the GPS device. The present invention provides systems and methods for filtering out the "wild readings", thus improving the accuracy of the GPS device.

Figure 7A:
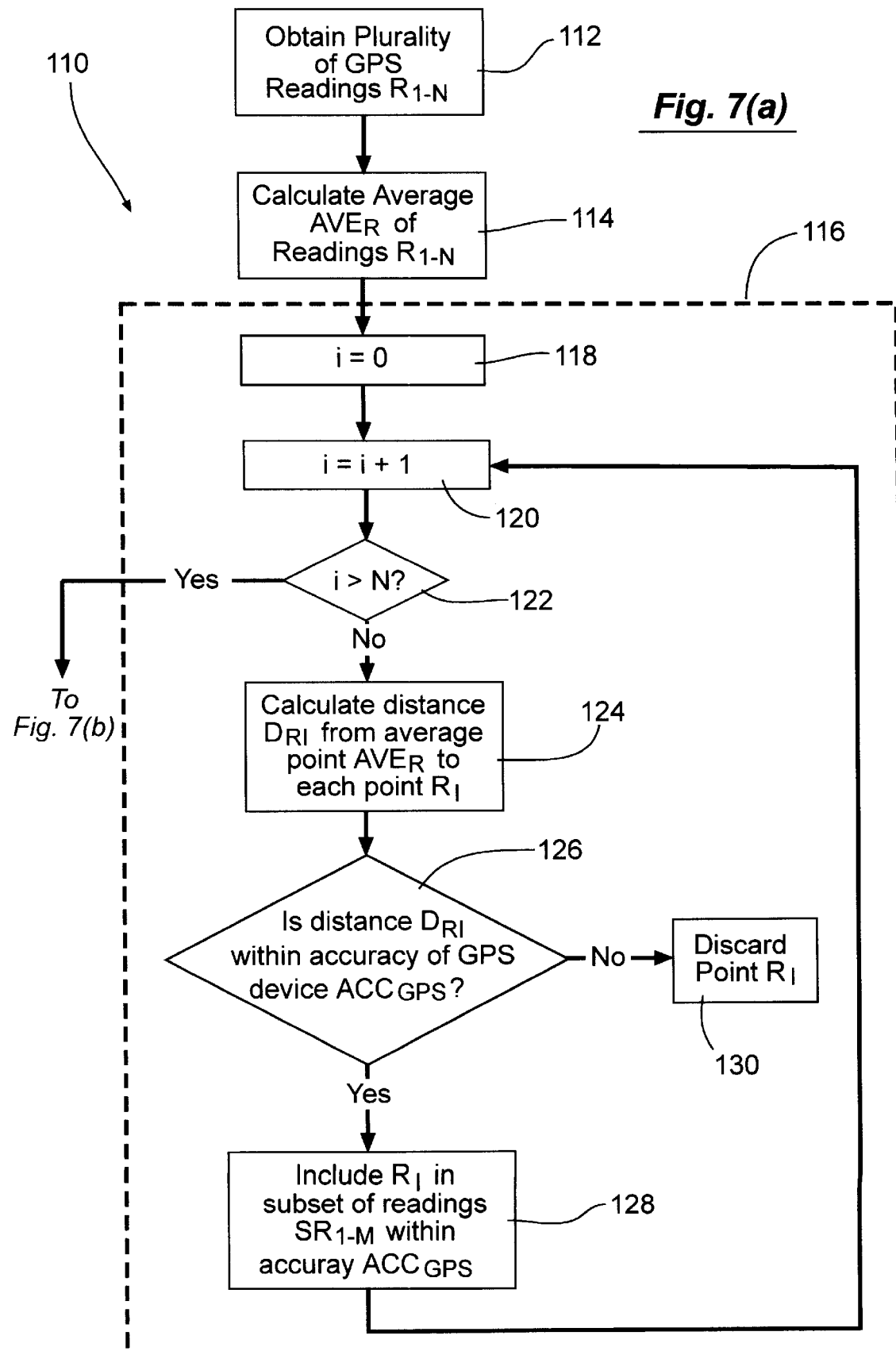
FIG. 7 is a flow chart diagram illustrating a method for improving the reading accuracy of a GPS receiver.

Referring now to FIG. 7, a method for filtering out "wild readings", and thus improving the accuracy of the GPS readings is illustrated in the form of flow chart 110. In accordance with one embodiment of the present invention, a GPS receiver (e.g., receiver 86) obtains two or more GPS readings $R_{1-N}$ and preferably stores readings $R_{1-N}$ in a memory or storage area (e.g., within computing device 88) (step 112). Next, an average $AVE_R$ of readings $R_{1-N}$ is calculated (step 114). After average $AVE_R$ is calculated, a loop 116 is performed to determine if each reading $R_{1-N}$ is within an accuracy $ACC_{GPS}$ of the GPS receiver, and if so, to accumulate a subset of readings $SR_{1-M}$ which includes all readings $R_{1-N}$ within accuracy $ACC_{GPS}$. The accuracy $ACC_{GPS}$ of the GPS receiver may be stored within the GPS receiver, or the computing device associated with the GPS receiver.

In accordance with one embodiment of the present invention, loop 116 may be performed as follows. First, a loop counter [i] is set to zero (0) (step 118). Next, loop counter [i] is incremented by one (1) (step 120), and then loop counter [i] is checked to determine if it is greater than the total number of readings N (step 122). If not, a distance $D_{Ri}$ from average point $AVE_R$ to the point $R_i$ is calculated (step 124). Distance $D_{Ri}$ is compared to GPS receiver accuracy $ACC_{GPS}$ to determine if $D_{Ri}$ is less than the accuracy radius $ACC_{GPS}$ (step 126). If it is, $R_i$ is included in the subset of readings $SR_{1-M}$ (step 128). Otherwise, reading $R_i$ is discarded (step 130). In either case, the flow returns to step 120 where loop counter [i] is incremented by one (1). This loop process continues until loop counter [i] is greater than N; that is, until the last reading $R_N$ has been processed. When [i] is greater than N at step 122, the process moves to step 132.

At step 132, a new average $AVE_{SR}$ is calculated using all the reading in the subset of readings $SR_{1-M}$. This new average $AVE_{SR}$ is the new calculated average location (e.g., latitude, longitude and altitude) of that particular position, excluding any "wild readings". In addition, this process can continue, so that a new average location $AVE_{SR}$ can be calculated as new readings are taken. For example, if a user has not accepted the average value by activating the "Accept" button 104 (FIG. 6), additional readings $R_O$ will be taken. That is, the answer at decision step 134 will be "YES", and an additional GPS reading $R_O$ will be obtained (step 136). Next, a distance $D_{RO}$ from the average point $AVE_{SR}$ is calculated by subtracting $R_O$ from $AVE_{SR}$ (step 138). If distance $D_{RO}$ is within the accuracy $ACC_{GPS}$ of the GPS receiver (step 140), a new average location $AVE_{SR}$ is calculated using the subset of reading $SR_{1-M}$ and the additional GPS reading $R_O$ (step 142). If $R_O$ is outside the accuracy radius $ACC_{GPS}$ (i.e., $D_{RO} > ACC_{GPS}$), the GPS reading $R_O$ is discarded (step 144). In either case, the process returns to step 134 to determine if addition GPS readings are to be taken. If so, steps 136–144 are repeated. If not, the process ends (step 146), and the last calculated average location $AVE_{SR}$ is the location value used.

As one skilled in the art will appreciate, the accuracy of GPS receivers tends to increase after about 60 seconds, because the GPS readings tend to stabilize after that time period. Therefore, in accordance with one embodiment of the present invention, the process preferably continues until about 60 readings are used to calculate the average location values, thus further improving the accuracy of the GPS unit. Attached as Appendix A is a listing of computer code for performing the GPS Filtering function.

Form Generation

When collecting data, for example, using a handheld device running the Windows CE™ operating system, it is important to have accurate, easy to use forms in which to enter the data. Unfortunately, however, because each data acquisition application typically requires unique information for that application, it is difficult to find adequate forms to use for data input. Therefore, what is needed is a system and method for creating custom forms or templates.

Accordingly, the present invention provides a system and application for creating custom forms. In accordance with one embodiment of the present invention, a form creation application which runs on a Windows CE™ operating system is provided.

Figure 8A:
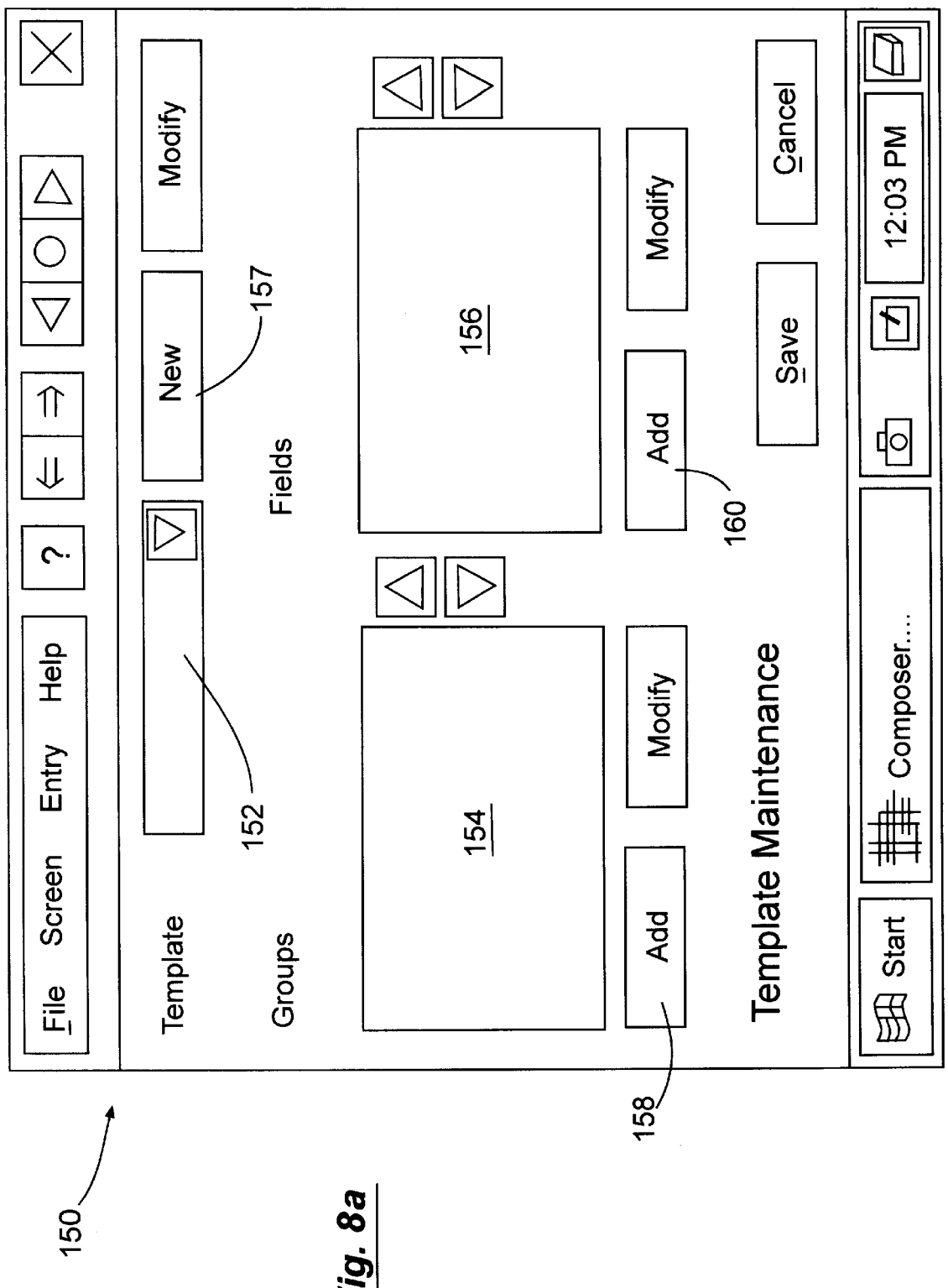
FIGS. 8a–8e are screen shots illustrating a method for creating document templates.
Figure 8B:
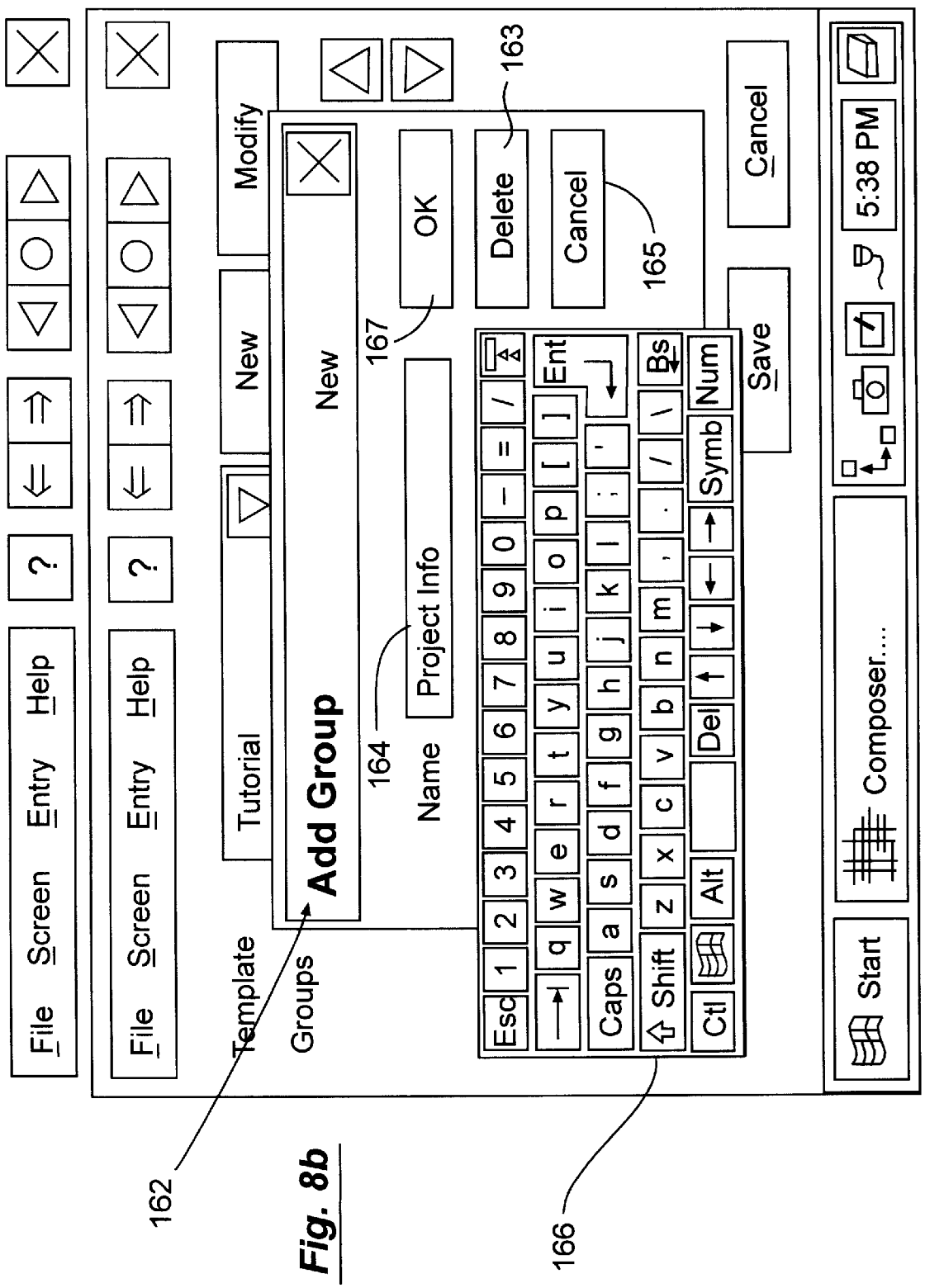

Referring now to FIGS. 8a–8b, the application for creating custom forms or templates will now be described. When the custom template application is invoked on a handheld device running the Windows CE™ operating system, a template maintenance screen 150 is displayed (FIG. 8a). Template maintenance screen 150 includes a "Template" box 152 for entering the name of the template, a "Group" box 154 for entering one or more groups for that template, and a "Fields" box 156 for entering individual fields for each group. To create a new template, "New" button 157 is pressed. This allows the user to input the name of the new template being created. Next, one or more groups are created. To add a group, the user selects "Add" button 158, which will cause an "Add Group" screen 162 to appear. At the "Add Group screen, a user can use an electronically displayed keyboard 166 to enter the group name in "Group Name" box 164. Add Group screen 162 also includes a "Delete" button 163 for deleting a group that was already created, a "Cancel" button 165 for canceling a name entered into box 164, and an "Ok" button 167 for accepting and adding the group name entered in box 164.

Figure 8C:
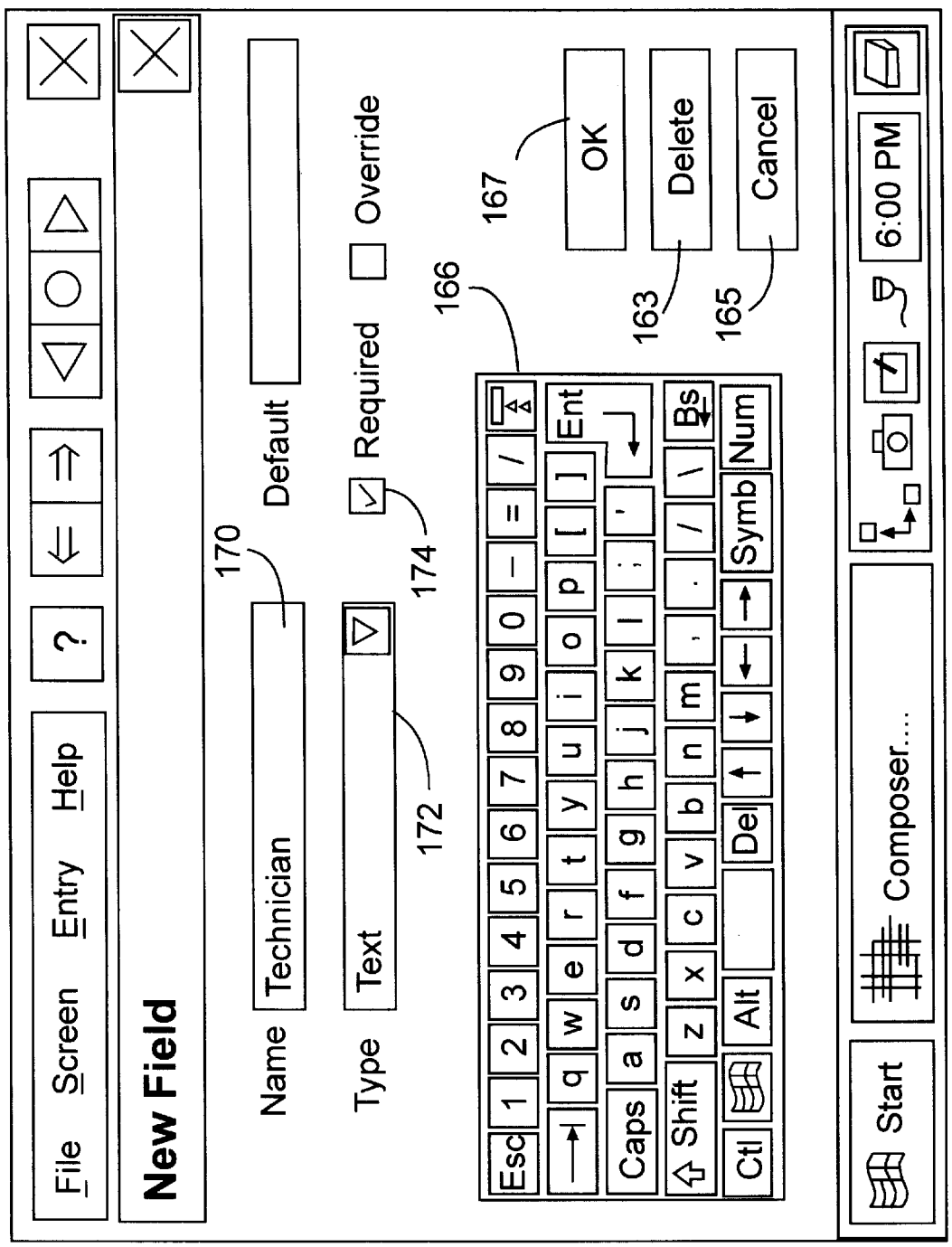
Figure 8D:
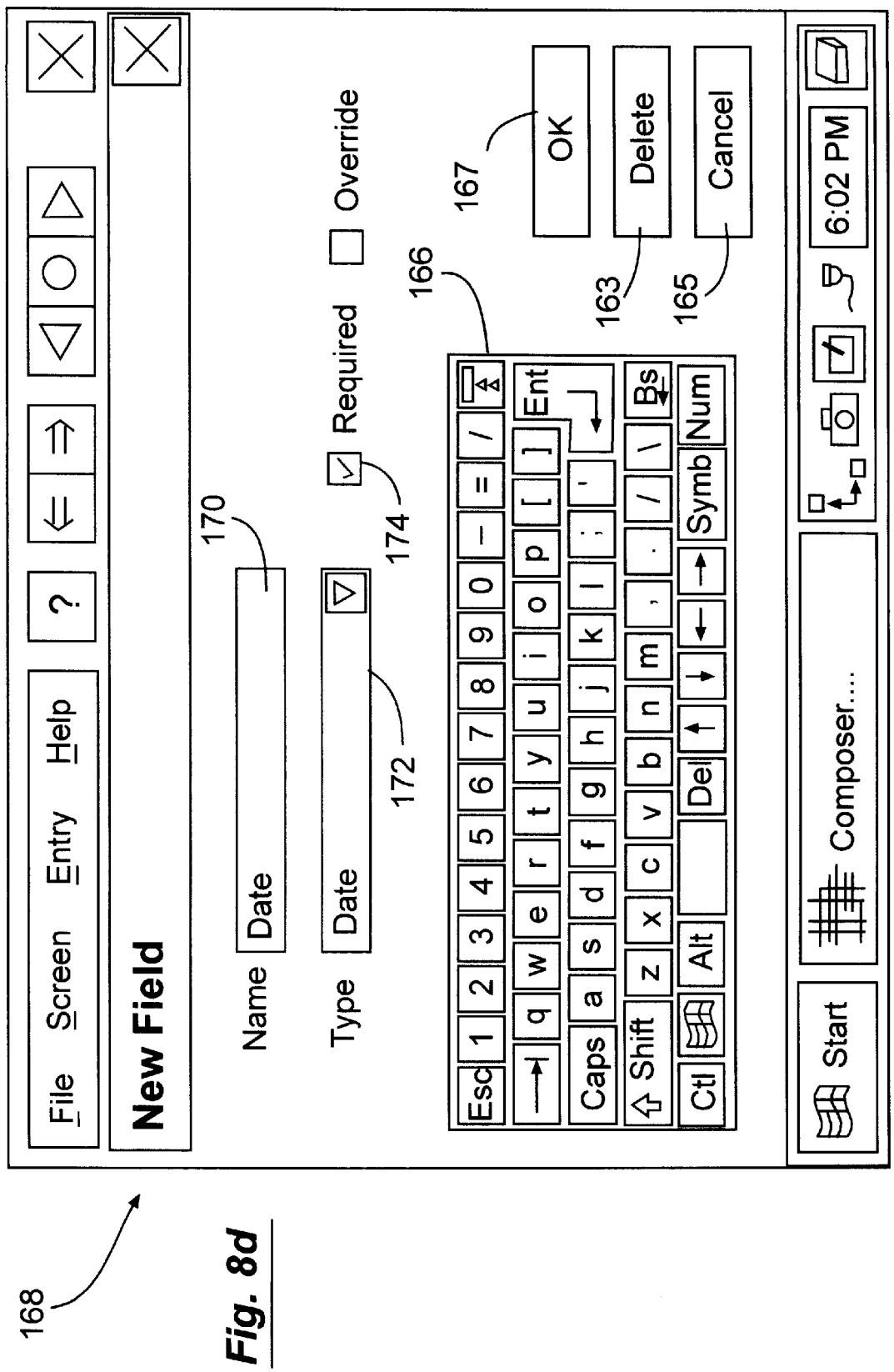
Figure 8E:
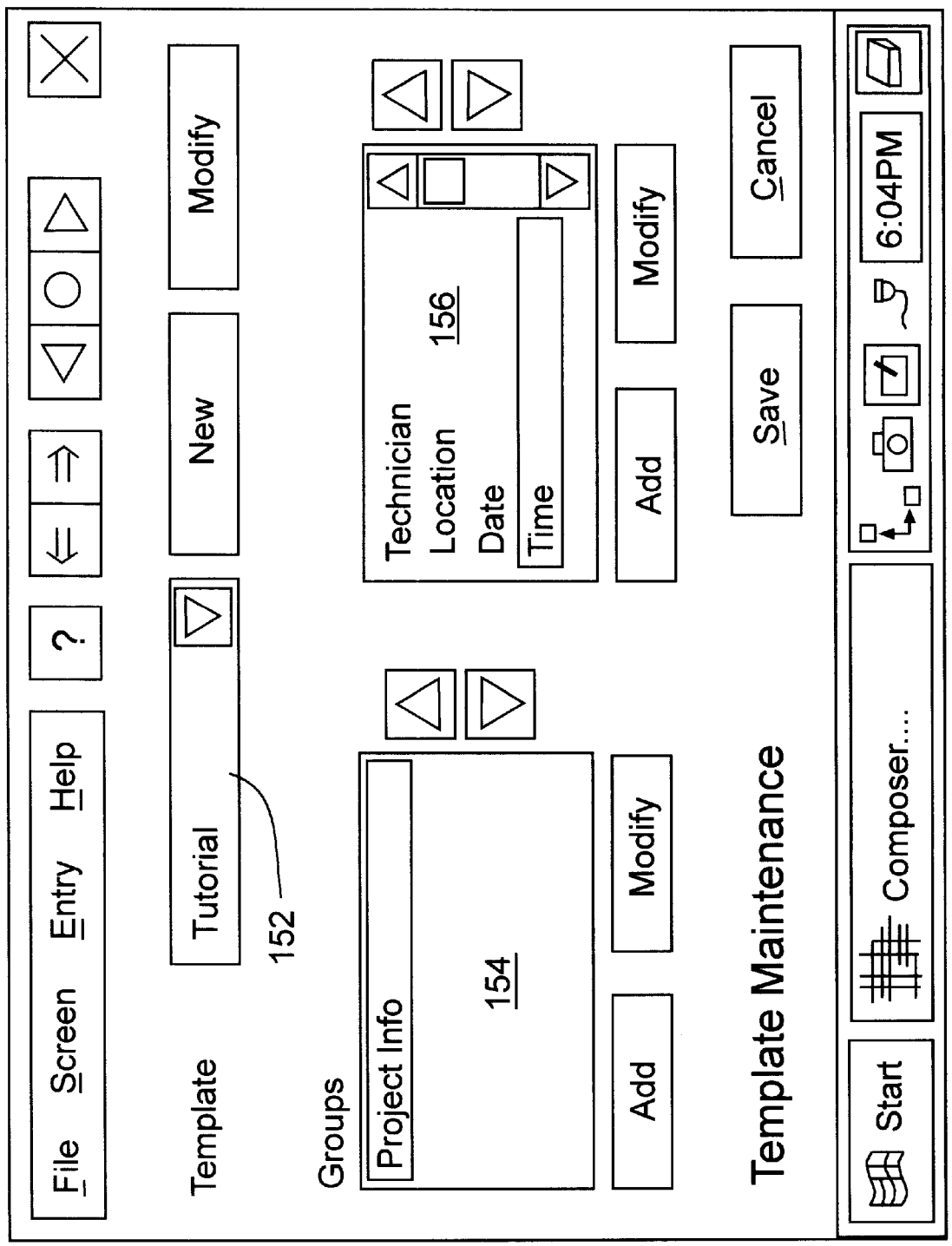

After a group is created, fields are added for the group. To add fields to a group, "Add" button 160 is selected, which brings up "New Field" screen 168. New Field screen 168 also includes a keyboard 166 for inputting a Field Name in name box 170. In addition, the user can enter Field Type in field box 172 and can specify whether or not the field is a required field by selecting box 174. As with Add Group screen 162, New Field screen 168 includes Delete button 163, Cancel button 165 and Ok button 167. FIG. 8c illustrates the creation of a "Technician" field, and FIG. 8d illustrates the creation of a "Date" field. As one skilled in the art will appreciate, the New Field creation process will continue until all the necessary fields are created for a particular group. In addition, the group creation process will continue until all necessary groups are created for a particular template. As illustrated in FIG. 8e, template maintenance screen 152 shows that the template "Tutorial" includes a Project Info group having Technician, Location, Date, and Time fields. As one skilled in the art will appreciate, template maintenance screen 150 can be used to create templates for any type of data acquisition or maintenance application.

CONCLUSION

In conclusion, the present invention provides a novel system and method for providing calculating a location of an object, improving GPS accuracy reading and creating custom forms on Windows CE™ devices. While a detailed description of presently preferred embodiments of the invention have been given above, various alternatives, modifications, and equivalents will be apparent to those skilled in the art. For example, while the system for calculating the location of objects and creating maps is illustrated as having separate GPS range finder and computing components, one skilled in the art will appreciate that these components could be configured together as a single device without varying from the spirit of the invention. Therefore, the above description should not be taken as limiting the scope of the invention which is defined by the appended claims.

What is claimed is:

1. A method for calculating a location of an object using a global positioning system (GPS) receiver and a range finder, comprising the steps of:
   obtaining a latitude location and a longitude location of a first position using a GPS receiver;
   obtaining a latitude location and a longitude location of a second position using said GPS receiver;
   locating a distance from said second position to a third position using a range finder, said third position being a position of an object;
   calculating an azimuth for said third position using said first and said second positions; and
   calculating a latitude location and a longitude location of said third position using said latitude location and said longitude location of said second position, said distance from said second position to said third position, and said azimuth.

2. The method as recited in claim 1, wherein said step of calculating an azimuth comprises:
   calculating a preliminary azimuth from said first position to said second position using said latitude locations and said longitude locations of said first and said second positions; and
   adding ninety degrees (90°) to said preliminary azimuth if said third position is to the right of said second position or subtracting ninety degrees (90°) from said preliminary azimuth if said third position is to the left of said second position.

3. The method as recited in claim 1, wherein said step of obtaining a location of a first position and said step of obtaining a location of a second position further comprises obtaining altitude locations for said first and said second positions.

4. The method as recited in claim 3, wherein said step of locating a distance from said second position to a third position using a range finder, further comprises the step of determining an inclination angle from said second position to said third position using said range finder; and wherein said method further comprises calculating an altitude of said third position using said altitude of said second position and said inclination angle from said second position to said third position.

5. The method as recited in claim 1, wherein said method is used to create a map of objects.

6. The method as recited in claim 5, wherein said objects comprise at least one object from the group of objects comprising utility poles, utility boxes, water meters, houses, and commercial buildings.

7. A method for creating a map of objects, comprising the steps of:
   calculating a location of each of said objects using a global positioning system (GPS) receiver and a range finder, said calculating step comprising the sub-steps of:
   obtaining a latitude location and a longitude location of a first position using a GPS receiver;
   obtaining a latitude location and a longitude location of a second position using said GPS receiver;
   locating a distance from said second position to a third position using a range finder, said third position being a position of an object;
   calculating an azimuth for said third position using said first and said second positions; and
   calculating a latitude location and a longitude location of said third position using said latitude location and said longitude location of said second position, said distance from said second position to said third position, and said azimuth;
   storing each of said calculated locations of each of said objects in a database; and
   generating a map using said calculated locations stored in said database.

8. The method as recited in claim 7, wherein said step of calculating an azimuth comprises:
   calculating a preliminary azimuth from said first position to said second position using said latitude locations and said longitude locations of said first and said second positions; and
   adding ninety degrees (90°) to said preliminary azimuth if said third position is to the right of said second position or subtracting ninety degrees (90°) from said preliminary azimuth if said third position is to the left of said second position.

9. The method as recited in claim 7, wherein said step of obtaining a location of a first position and said step of obtaining a location of a second position further comprises obtaining altitude locations for said first and said second positions.

10. The method as recited in claim 9, wherein said step of locating a distance from said second position to a third position using a range finder, further comprises the step of determining an inclination angle from said second position to said third position using said range finder; and wherein said method further comprises calculating an altitude of said third position using said altitude of said second position and said inclination angle from said second position to said third position.

11. The method as recited in claim 7, wherein said objects comprise at least one object from the group of objects comprising utility poles, utility boxes, water meters, houses, and commercial buildings.

12. A system for calculating and storing locations of objects, comprising:
   a computing device;
   a global positioning system (GPS) receiver in communication with said computing device; and
   a range finder in communication with said computing device;
   said system being configured to calculate and store said locations of objects by:
   said GPS receiver obtaining a latitude location and a longitude location of a first position, and storing said latitude location and said longitude location of a first position in said computing device;
   said GPS receiver obtaining a latitude location and a longitude location of a second position, and storing said latitude location and said longitude location of a second position in said computing device;
   said range finder locating a distance from said second position to a third position using a range finder, and storing said distance from said second position to said third position in of said computing device, said third position being the position of an object;
   said computing device calculating an azimuth for said third position using said first and said second positions stored in said computing device; and
   said computing device calculating and storing a latitude location and a longitude location of said third position using said latitude location and said longitude location of said second position, said distance from said second position to said third position, and said azimuth.

13. The system as recited in claim 12, wherein said computing device comprises a computing device running the Windows CE™ operating system.

14. The system as recited in claim 12, wherein said stored locations of objects are used to create maps of said objects.

15. The system as recited in claim 12, wherein said computing device calculates said azimuth by:
   calculating a preliminary azimuth from said first position to said second position using said latitude locations and said longitude locations of said first and said second positions; and
   adding ninety degrees (90°) to said preliminary azimuth if said third position is to the right of said second position or subtracting ninety degrees (90°) from said preliminary azimuth if said third position is to the left of said second position.

16. The system as recited in claim 12, wherein said GPS receiver further obtains and stores in said computing device altitude locations for said first and said second positions.

17. The system as recited in claim 16, wherein said range finder further obtains and stores in said computing device an inclination angle from said second position to said third position; and wherein said computing device further calculates an altitude of said third position using said altitude of said second position and said inclination angle from said second position to said third position.

18. The system as recited in claim 12, wherein said objects comprise at least one object from the group of objects comprising utility poles, utility boxes, water meters, houses, and commercial buildings.

19. The system as recited in claim 12, wherein said GPS receiver and said computing device are configured together as a single integral unit.

20. A method for improving the location measuring accuracy of a global positioning system (GPS) receiver by calculating an average measured location AVE, said method comprising the steps of:
   (a) determining an accuracy $ACC_{GPS}$ for a GPS receiver;
   (b) obtaining a plurality of GPS location readings $R_{1-N}$ at a position;
   (c) calculating a first average location AVER, which is an average of said plurality of GPS location readings $R_{1-N}$;
   (d) obtaining a subset of GPS location readings $SR_{1-M}$ from said plurality of GPS location readings $R_{1-N}$ which are within said accuracy $ACC_{GPS}$ of said GPS receiver by subtracting each one of said plurality of GPS location readings $R_{1-N}$ from said average position $AVE_R$ to get a distance $D_R$ that each one of said plurality of GPS location readings $R_{1-N}$ are from said average position $AVE_R$, and including in said subset of readings $SR_{1-M}$ each one of said plurality of GPS location readings $R_{1-N}$ that has a distance $D_R$ less than said accuracy $ACC_{GPS}$ of said GPS receiver; and
   (e) calculating a new average location $AVE_{SR}$, which is an average of said subset of location readings $SR_{1-M}$.

21. The method as recited in claim 20, further comprising the steps of:
   (f) obtaining an additional GPS location reading $R_O$ at said position;
   (g) determining if said additional GPS location reading $R_O$ is within said accuracy $ACC_{GPS}$ of said GPS receiver by subtracting said additional GPS location reading $R_O$ from said new average position $AVE_{SR}$ to get a distance $D_{RO}$ from said average position $AVE_{SR}$; and
   (h) if said additional GPS reading $R_O$ has a distance $D_{RO}$ less than said accuracy $ACC_{GPS}$ of said GPS receiver, calculating a new average location $AVE_{SR}$, which is an average of said subset of location readings $SR_{1-M}$ and said additional GPS location reading $R_O$.

22. The method as recited in claim 21, wherein steps f, g, and h are repeated until at least sixty (60) GPS location readings are used to calculate said new average location $AVE_{SR}$.

23. A system for improving the location measuring accuracy of a global positioning system (GPS) receiver by calculating an average measured location, comprising:
   a computing device; and
   a global positioning system (GPS) receiver in communication with said computing device;
   said system being configured to calculate an average measured location AVE by:
   said computing device obtaining a GPS receiver accuracy $ACC_{GPS}$ from said GPS receiver;
   said GPS receiver obtaining a plurality of GPS location readings $R_{1-N}$ at a position, and storing said GPS location readings $R_{1-N}$ in said computing device;

said computing device calculating a first average location $AVE_R$, which is an average of said plurality of GPS location readings $R_{1-N}$;

said computing device obtaining a subset of GPS location readings $SR_{1-M}$ from said plurality of GPS location readings $R_{1-N}$ which are within said accuracy $ACC_{GPS}$ of said GPS receiver by subtracting each one of said plurality of GPS location readings $R_{1-N}$ from said average position $AVE_R$ to get a distance $D_R$ that each one of said plurality of GPS location readings $R_{1-N}$ are from said average position $AVE_R$, and including in said subset of readings $SR_{1-M}$ each one of said plurality of GPS location readings $R_{1-N}$ that has a distance $D_R$ less than said accuracy $ACC_{GPS}$ of said GPS receiver; and said computing device calculating a new average location $AVE_{SR}$, which is an average of said subset of location readings $SR_{1-M}$.

24. The system as recited in claim 23, wherein said system continues to calculate a new average location by:

said GPS receiver obtaining an additional GPS location reading $R_O$ at said position;

said computing device determining if said additional GPS location reading $R_O$ is within said accuracy $ACC_{GPS}$ of said GPS receiver by subtracting said additional GPS location reading $R_O$ from said new average position $AVE_{SR}$ to get a distance $D_{RO}$ from said average position $AVE_{SR}$; and if said additional GPS reading $R_O$ has a distance $D_{RO}$ less than said accuracy $ACC_{GPS}$ of said GPS receiver, said computing device calculating a new average location $AVE_{SR}$, which is an average of said subset of location readings $SR_{1-M}$ and said additional GPS location reading $R_O$.

25. The system as recited in claim 24, wherein a new average location $AVE_{SR}$ is calculated until at least sixty (60) GPS location readings are used to calculate said new average location $AVE_{SR}$.

26. The system as recited in claim 23, wherein said computing device comprises a computing device running the Windows CE™ operating system.

27. A global positioning system (GPS) receiver apparatus, comprising:

a GPS receiver;

a processor; and a memory;

said GPS receiver apparatus being configured to calculate an average measured location by:

said processor determining a GPS receiver accuracy $ACC_{GPS}$ for said GPS receiver;

said GPS receiver obtaining a plurality of GPS location readings $R_{1-N}$ at a position, and storing said GPS location readings $R_{1-N}$ in said memory;

said processor calculating a first average location $AVE_R$, which is an average of said plurality of GPS location readings $R_{1-N}$;

said processor obtaining a subset of GPS location readings $SR_{1-M}$ from said plurality of GPS location readings $R_{1-N}$ which are within said accuracy $ACC_{GPS}$ of said GPS receiver by subtracting each one of said plurality of GPS location readings $R_{1-N}$ from said average position $AVE_R$ to get a distance $D_R$ that each one of said plurality of GPS location readings $R_{1-N}$ are from said average position $AVE_R$, and including in said subset of readings $SR_{1-M}$ each one of said plurality of GPS location readings $R_{1-N}$ that has a distance $D_R$ less than said accuracy $ACC_{GPS}$ of said GPS receiver; and said processor calculating a new average location $AVE_{SR}$, which is an average of said subset of location readings $SR_{1-M}$.

28. The GPS receiver apparatus as recited in claim 27, wherein said GPS receiver apparatus continues to calculate a new average location $AVE_{SR}$ by:

said GPS receiver obtaining an additional GPS location reading $R_O$ at said position;

said processor determining if said additional GPS location reading $R_O$ is within said accuracy ACCGPS of said GPS receiver by subtracting said additional GPS location reading $R_O$ from said new average position $AVE_{SR}$ to get a distance $D_{RO}$ from said average position $AVE_{SR}$; and if said additional GPS reading $R_O$ has a distance $D_{RO}$ less than said accuracy $ACC_{GPS}$ of said GPS receiver, said processor calculating a new average location $AVE_{SR}$, which is an average of said subset of location readings $SR_{1-M}$ and said additional GPS location reading $R_O$.

29. The system as recited in claim 27, wherein a new measured location $AVE_{SR}$ is calculated until at least sixty (60) GPS location readings are used to calculate said average location $AVE_{SR}$.

30. The system as recited in claim 27, wherein said computing device comprises a computing device running the Windows CE™ operating system.

* * * * *